US011625801B2

(12) United States Patent
Low

(10) Patent No.: US 11,625,801 B2
(45) Date of Patent: Apr. 11, 2023

(54) SURVEY SUBMISSION SYSTEM AND METHOD FOR PERSONALIZED CAREER COUNSELING

(71) Applicant: Jiun Jack Low, Gombak (MY)

(72) Inventor: Jiun Jack Low, Gombak (MY)

( * ) Notice: Subject to any disclaimer, the term of this patent is extended or adjusted under 35 U.S.C. 154(b) by 846 days.

(21) Appl. No.: 16/389,968

(22) Filed: Apr. 21, 2019

(65) Prior Publication Data

US 2019/0325542 A1 Oct. 24, 2019

(51) Int. Cl.
*G06Q 10/00* (2012.01)
*G06Q 50/20* (2012.01)
*G06Q 30/0201* (2023.01)
*G06Q 30/0203* (2023.01)

(52) U.S. Cl.
CPC ..... *G06Q 50/2057* (2013.01); *G06Q 30/0203* (2013.01); *G06Q 30/0206* (2013.01)

(58) Field of Classification Search
CPC ............. G06Q 10/105; G06Q 10/1053; G06Q 30/0243; G06Q 30/0244; G06Q 30/0251
See application file for complete search history.

(56) References Cited

U.S. PATENT DOCUMENTS

| | | | | |
|---|---|---|---|---|
| 2005/0096973 | A1* | 5/2005 | Heyse | G06Q 10/105 705/320 |
| 2013/0164720 | A1* | 6/2013 | Siimes | G06Q 10/1053 434/219 |
| 2015/0066559 | A1* | 3/2015 | Brouwer | G06Q 10/1097 705/327 |
| 2018/0137589 | A1* | 5/2018 | Kenthapadi | G06Q 50/2053 |
| 2018/0365619 | A1* | 12/2018 | Hardy | G06F 21/6254 |
| 2021/0056957 | A1* | 2/2021 | Docherty | G10L 25/51 |

FOREIGN PATENT DOCUMENTS

| | | | | |
|---|---|---|---|---|
| WO | WO-2007089920 | A2 * | 8/2007 | G09B 19/00 |
| WO | WO-2015039208 | A1 * | 3/2015 | G06Q 30/0207 |

OTHER PUBLICATIONS

Ovadia, The effect of client attachment style and counselor functioning on career exploration, 2008, Journal of Vocational Behavior, 77, all pages (Year: 2008).*

* cited by examiner

Primary Examiner — Hafiz A Kassim
Assistant Examiner — Zahra Elkassabgi
(74) Attorney, Agent, or Firm — Christopher Pilling

(57) ABSTRACT

A survey submission system and method for a personalised career counselling is provided to multiple users. The system includes one or more display devices with a display unit, a display region variation determining unit, a preloading controller, and a preloading performing unit displaying multiple program parameters in proximity to a short text field. Particularly, one or more display devices includes multiple display device modules and display device modules is selected from any one of an user interface module, an admin interface module, a sponsor interface module admin interface module and an expert interface module. Moreover, the system also has a remote server for storing a multiple of databases for storing multiple data related to program parameters. Particularly, one or more display device and the remote server communicate via a communication channel enabling users to communicate with other users and experts in a highly secured chat room. Moreover, communication is via secure chat room enabling users to share information only with user consent. The system analyses the answers by a trend data analysis.

10 Claims, 21 Drawing Sheets

Photo

Name

Date of Birth

Email

Phone no

I agreed for xxxx to share my above data to it's associates

FIG. 2A

| Test on Various Category | |
|---|---|
| Question 1 | Like/Dislike |
| Question 2 | Like/Dislike |
| Question 3 | Like/Dislike |
| Question 4 | Like/Dislike |
| Question 5 | Like/Dislike |
| Question 6 | Like/Dislike |
| Question 7 | Like/Dislike |
| Question 8 | Like/Dislike |
| Question 9 | Like/Dislike |
| Question N | Like/Dislike |
| | Next |

FIG. 3

| Institutional Name |
| Main URL |
| Email |
| Contact Person (Billing) |
| Contact Email (Billing) |
| Contact Tel (Billing) |
| Contact Person (Adv) |
| Contact Email (Adv) |
| Contact Tel (Adv) |

Logo (can upload)

Available Credits

SURVEY SUBMISSION SYSTEM AND METHOD FOR PERSONALIZED CAREER COUNSELING

FIELD OF THE INVENTION

Embodiments of the present invention relates to an online survey submission and more particularly, relates to systems, methods and devices for analyzing the trends of users based on multiple user inputs to provide personalized career counselling, developmental support, career and expert advice support and the like.

BACKGROUND OF THE INVENTION

Large populations of students are unsure of occupation that is suitable to them even after taking admission in a college or university program. Many high school graduates decide to enter into a college/university program based on friendship, potential income, convenience and comfort. Despite the information technology and tremendous growth of knowledge, our education system fails to develop student's creativity, independent thinking and capabilities so that they can make responsible career choices and make the best of the opportunities that lay ahead.

There is a lack of self understanding, personal planning and goal setting abilities among students which result in limited work efficiency and demoralized work attitude among students due to lack of interest, when they enter workplace. This could further lead to depressions.

The existing career counselling platforms are either developed by colleges/universities with self-interest resulting in bias result to the student; and are not affordable to most students. Also the development of peer support is not possible by the existing systems and methods. The users might have to find their own ways to discover any alike peers. Further, the existing implementation that are available in the market only provide consultation based on the occupational report and the users need to conduct own research to find possible courses to pursue their chosen occupation. The consultation provided by the existing platforms is often limited to their own counselors. The users have to find more consultants by themselves if the counselor's advices were not fulfilling.

The nearest technology available to-date is only an online survey that produces a report to users. User needs to pay a fee for it. There are free versions with lighter implementation of the same. However, currently in the prior art, there is no existing system and method which is able to provide analysis based on history records, peer development support, assess to pool of experts and assess to collection of universities and colleges that offer a pathway for the chosen occupation.

Accordingly, there remains a need in the market for a product that provides additional support for each user to explore their occupation as they are making their decisions.

Therefore the present invention relates to systems and methods based on the combination of latest technology together with old theory and series of contemporary needs to facilitate the users in discovering a suitable occupation.

SUMMARY OF THE INVENTION

Embodiments of the present disclosure relates to a survey submission system for a personalised career counselling provided to multiple users. Particularly, the system also includes one or more display devices. Each display device is with a display unit, a display region variation-determining unit, a preloading controller, and a preloading performing unit for displaying multiple program parameters in proximity to a short text field. Moreover, one or more display devices include multiple display device modules. Furthermore, the multiple display device modules is selected from any one of an user interface module, an admin interface module, a sponsor interface module and an expert interface module.

Furthermore, the system has one or more remote servers for storing multiple of databases and data related to program parameters. Particularly, the remote server further includes a memory unit for storing multiple modules and the multiple of modules further comprises a computing module, a recommendation module, a credit module, a campaign module, and the like. It also includes one or more processors and one or more computer-readable media having stored thereon instructions. Moreover, the user interface module is operably configured to enable the one or more users to contact anyone of a multiple of experts, a multiple of sponsor, and a multiple of alike contacts.

Furthermore, the instructions are executable by one or more processors to configure the system to display a multiple of program instructions to the multiple of users via the one or more display device. Particularly, one or more display device and the remote server communicate via a communication channel.

Various embodiments of present invention also include a method for a personalised career counselling provided to multiple users includes step of receiving and registering multiple of data fields provided by the one or more users. Particularly, generating a user profile of one or more user based on the multiple data fields and providing a multiple questions retrieved from a server to determine one or more suitable career options. Moreover, one or more suitable career option is generated for the one or more user based on a computation performed by a computing module of the server. Furthermore, the system provides an avenue for one or more users to reach experts by searching one or more experts. Subsequently, allowing one or more users to communicate with one or more experts in a chat-room for personalised career counselling.

Subsequently, multiple sponsor data is received by multiple sponsors to be viewed by multiple users. Particularly, one or more sponsor purchase credits are purchased by the multiple sponsors. Moreover, one or more sponsor purchase credits are allocated to multiple sponsors based on one or more strategic marketing campaigns.

In accordance to another embodiment of present invention the method include steps of providing anyone option of like or dislike to the multiple of users to answer the multiple of questions and automatically generating one or more expert based on one or more expert parameter. Particularly, initiating and facilitating communication between the one or more expert selected from the multiple experts and the one or more user in a virtual chat room via the communication channel. Particularly, the chat room is operably configured to provide the multiple users to communicate with the other users without revealing personal information facilitating secure communication. Furthermore, the chat room also has a feature to reveal the personal information when they are comfortable is something new.

Moreover, providing anyone option of like or dislike to the multiple users
to answer the multiple of questions. Furthermore, if the one or more user do not select an answer to a question from the multiple questions the computing module of the server automatically select the option of dislike and computation is based on analyzing the answers by a trend formula by dividing the answer to the multiple of questions the into two parts and calculating the average change percentage in part one of the trend formula based on a multiple of answers from start of the test to latest test result. Particularly, calculating the average change percentage over last three test in part two of the trend formula to determine trend change by comparing the average change percentage of the part one and the part two. Moreover, the trend percentage change in is result of one or more results based on the calculation of the part one and the part two.

In one embodiment, the trend change utilizes the part one trend percentage results when the part one and the part two results are growing percentage trends and when the part two growing percentage is lesser than the part one percentage. In another embodiment, the trend change utilizes the part two trend percentage results when the part one and the part two are growing percentage and when the part two growing percentage is greater than the part one percentage by more than twenty percentage.

In yet another embodiment, the trend change utilizes the part two trend percentage results when the part one and the part two has different growing trend and when part two growing percentage is greater than the part one percentage by more than twenty five percentage.

In yet another embodiment, the trend change utilizes the part one trend percentage results when the part one and the part two has different growing trend and part two growing percentage is lesser than the part one percentage by more than twenty five percentage.

Particularly, the display device is anyone of a user device, an admin device, a sponsor device and alike.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2A is a pictorial snapshot of a dashboard displaying multiple data fields to generate one or more user profiles for providing personalised career counselling in accordance with one or more embodiments of present invention;

FIG. 3 is a pictorial snapshot of a dashboard displaying multiple questions to determine and assess one or more abilities of the multiple users based on one or more user categories for providing personalised career counselling in accordance with one embodiment of present invention;

FIG. 7 is pictorial illustration of a sponsor dashboard setup with multiple sponsor fields to be viewed on one or more display device, in accordance to one or more embodiments of present invention;

FIG. 9 is pictorial illustration of an expert dashboard setup with multiple expert fields to be viewed on one or more display device, in accordance one or more embodiments of present invention;

DETAILED DESCRIPTION

Various embodiments of the present invention relate to generation of a personality survey and more particularly, relates to systems, methods and devices for trend analysis of subjects to provide development support, career and expert advice support. The principles of the present invention and their advantages are best understood by referring to FIG. 1 to FIG. 16.

In the following detailed description of illustrative or exemplary embodiments of the disclosure, specific embodiments in which the disclosure may be practiced are described in sufficient detail to enable those skilled in the art to practice the disclosed embodiments. For example, specific details such as specific method steps, structures, elements, and connections are presented herein. However, it is to be understood that the specific details presented need not be utilized to practice the embodiments of the present disclosure.

The following detailed description is, therefore, not to be taken in a limiting sense, and the scope of the present disclosure is defined by the appended claims and equivalents thereof.

References within the specification to "one embodiment," "an embodiment," "embodiments," or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

Figure 1A:
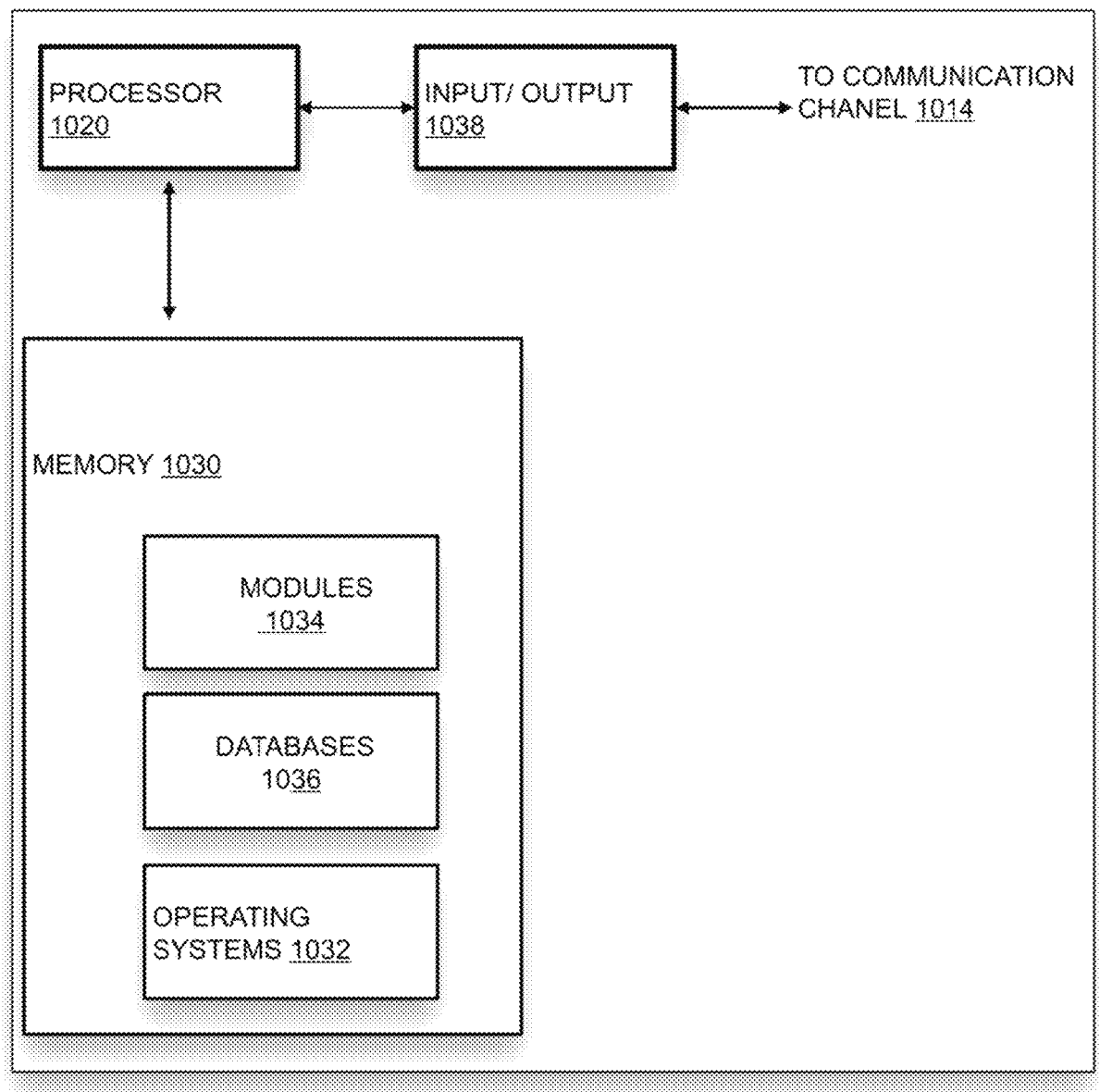
FIG. 1A is a block diagram illustration of an exemplary computer system within which various aspects of the disclosure can be implemented, in accordance with one or more embodiments of the present invention.
Figure 1B:
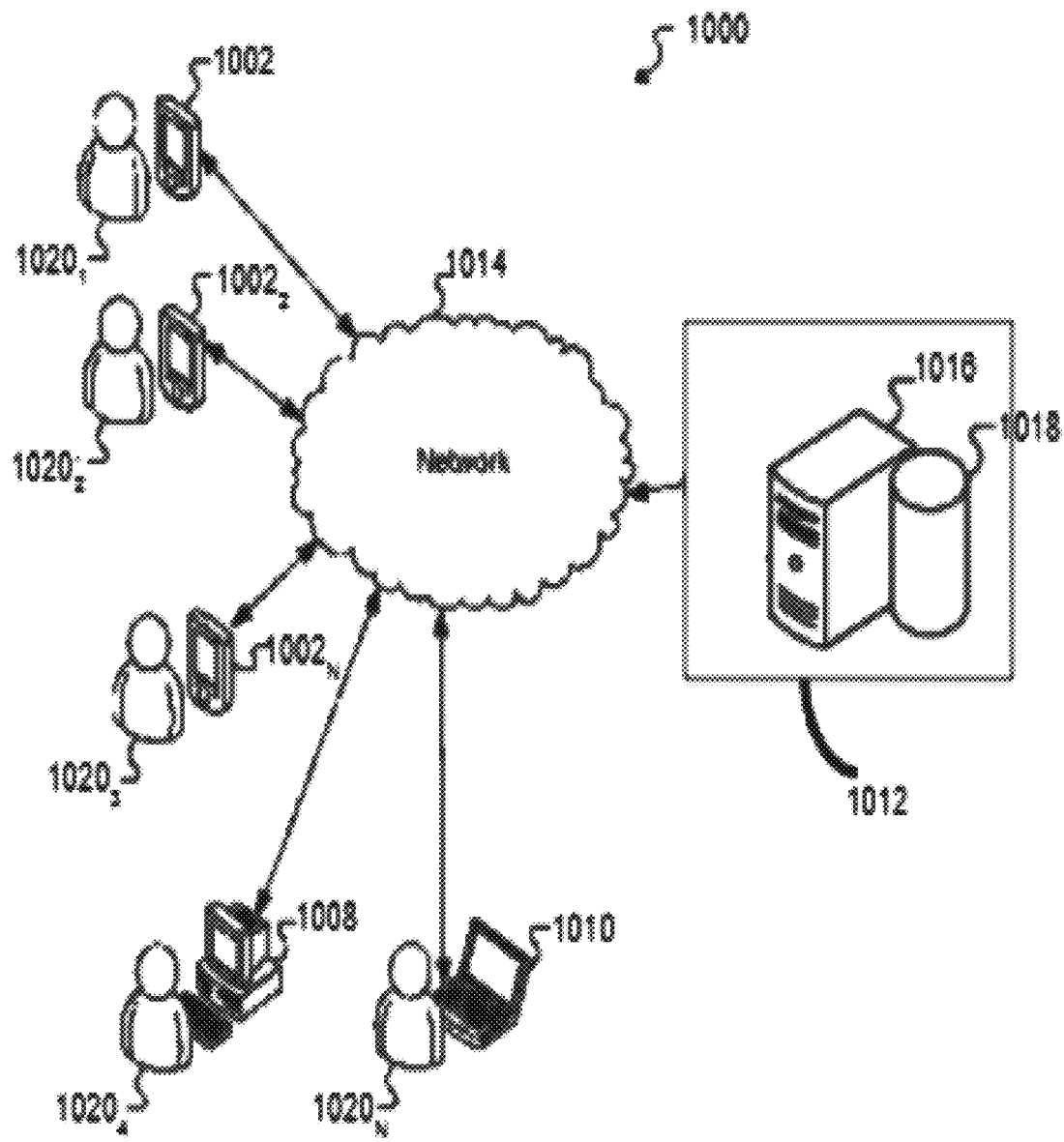
FIG. 1B is the example system that can be used in implementations of the present disclosure, in accordance with one or more embodiments of the present invention.
Figure 1C:
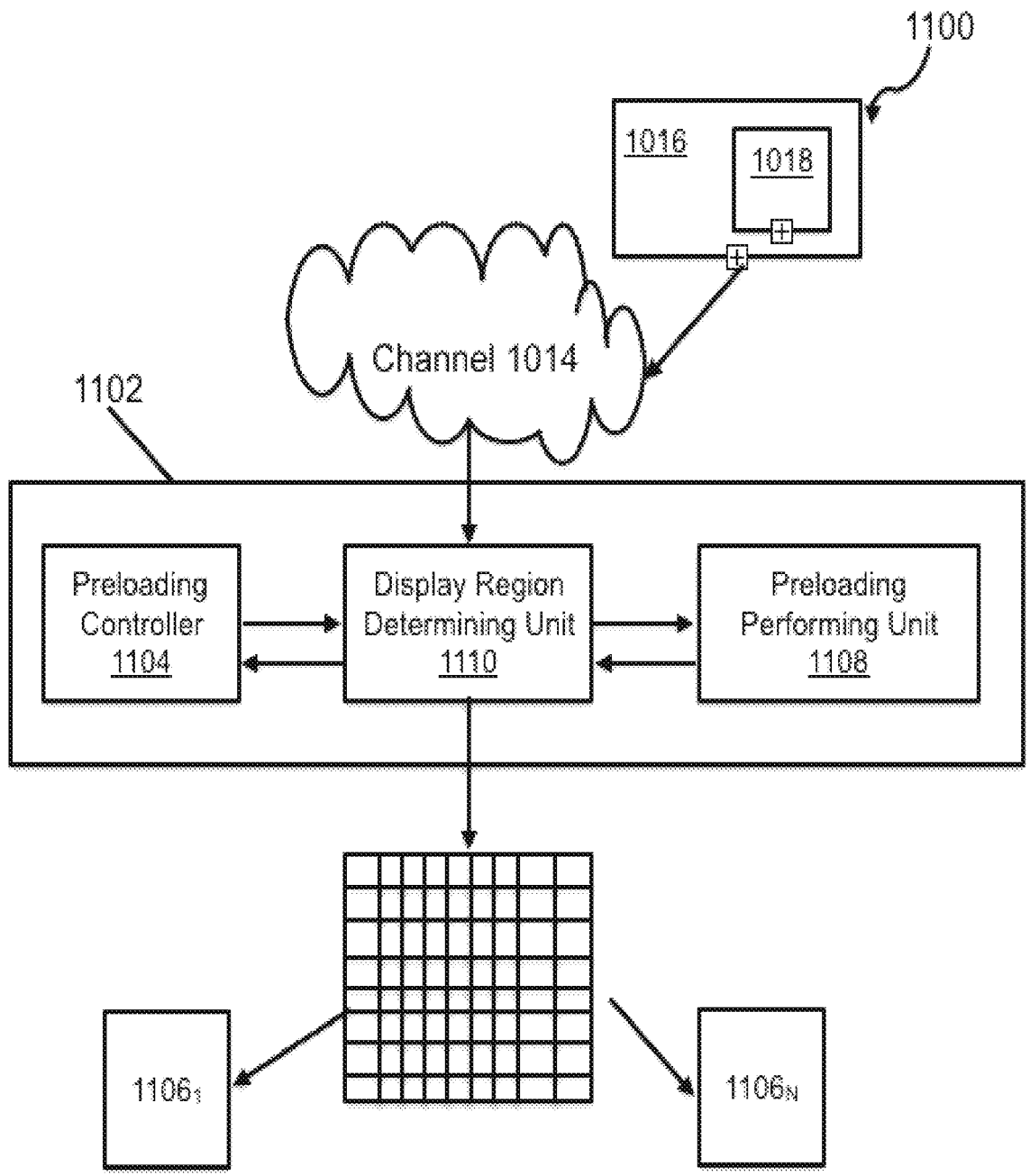
FIG. 1C is an example environment for survey submission system and display of one or more advertisements to one or more users, in accordance with one or more embodiments of the present invention.

FIG. 1A is a block diagram illustration of an exemplary computer system within which various aspects of the disclosure can be implemented, FIG. 1B is the example system that can be used in implementations of the present disclosure, and FIG. 1C is an example environment for survey submission system and display of one or more advertisements to one or more users, according to one or more embodiments of the present invention. A survey submission system 1000 for a personalised career counselling provided to multiple users $1020_1$ to $1020_n$. With reference now to the figures, particularly like reference numbers denote like parts, FIG. 1 illustrates a typical hardware configuration of a computer processing system 1000, which is representative of a hardware environment for practicing the present Invention.

Referring to FIG. 1, survey submission system 1000 may have one or more processors 1020 coupled to various other components. A computer operating system 1000 may run on processor 1020 and control and coordinate the functions of the various components of FIG. 1. Furthermore, multiple modules 1034 stored in memory 1030 and system 1000 includes one or more display devices $1002_1$, $1002_2$, . . . $1002_N$, 1008, 1010 with a display unit 1102, with the display region variation determining unit 1110, the preloading controller 1104 displaying a plurality of program parameters in proximity to a short text field on one or more display devices $1002_1$, $1002_2$, . . . $1002_N$, 1008, 1010. Moreover, it includes a plurality of modules 1034 and the plurality of modules 1034 is selected from any one of an user interface module (not shown), an admin interface module (not shown), a sponsor interface module and an expert interface module (not shown). Particularly, the remote server 1012 for storing a plurality of databases 1036 for storing a plurality of data related to program parameters. Moreover, the user interface module is operably configured to enable the one or more users to contact anyone of a multiple of experts, a multiple of sponsor, and a multiple of alike contacts.

Particularly, the remote server 1012 includes a memory unit 1030 storing multiple modules 1034 and multiple modules 1034 further includes a computing module(not shown), a recommendation module (not shown), a credit module (not shown), a campaign (not shown). Furthermore, one or more processors 1020 and one or more computer-readable media (not shown) having stored thereon instructions that are executable one or more processors 1020 to configure the system 1000 to display a multiple program instructions to one or more users $1020_1$, $1020_2$, . . . $1020_N$, via one or more display devices $1002_1$, $1002_2$, . . . $1002_N$, 1008, 1010.

In one embodiment, the various application databases 1036 store sponsor advertisement data as disclosed in the present invention. In another embodiment, the various application databases 1036 include data storage for one or more processors 1020 and one or more computer-readable media having stored thereon instructions that are executable by one or more processors 1020 to configure the system 1000 to display one or more advertisements, including instructions that are executable to configure the overall system 1000 to perform functions.

In yet another embodiment, the various databases 1036 include modules to receive input from the remote server 1012. The remote server 1012 provides the input from the user $1020_1$, $1020_2$, . . . $1020_N$ regarding module launch through one or more display devices $1002_1$, $1002_2$, . . . $1002_N$, 1008, 1010.

Henceforth, as described in more detail below in association with FIG. 1, it should be noted that software components including operating system 1032 and multiple modules 1034 of the present invention may be loaded into the processing system's main memory 1030 for execution. Accordingly, to one or more display devices $1002_1$, $1002_2$, . . . $1002_N$, 1008, 1010 (as illustrated in FIG. 1B) are connected to the remote server 1012 via the communication channel 1014.

Particularly the remote server 1012 connects one or more users $1020_1$, $1020_2$, . . . $1020_N$ to one or more display devices $1002_1$, $1002_2$, . . . $1002_N$, 1008, 1010 via communication channel 1014.

FIG. 1B depicts an example system 1000 that can be used in implementations of the present disclosure. The example system 1000 includes one or more display devices $1002_1$, $1002_2$, . . . $1002_N$, 1008, 1010 each of the display devices $1002_1$, $1002_2$, . . . $1002_N$, 1008, 1010 being associated with one of users $1020_1$, $1020_2$, . . . $1020_N$. The system 1000 also includes a communication channel 1014, and the remote server 1012. The display devices $1002_1$, $1002_2$, . . . $1002_N$, 1008, 1010 and the remote server 1012 can communicate with each other through the communication channel 1014.

Particularly, survey submission system 1012 can include one or more display devices $1002_1$, $1002_2$, . . . $1002_N$, 1008, 1010. Moreover, each of display device $1002_1$, $1002_2$, . . . $1002_N$, 1008, 1010 can represent various forms of processing devices. Example display devices can include a desktop computer, a laptop computer, a handheld computer, a tablet computer, a personal digital assistant (PDA), a cellular telephone, a communication channel 1014 appliance, a camera, a smart phone, an enhanced general packet radio service (EGPRS) mobile phone, a media player, a navigation device, an email device, a game console, or a combination of any these data processing devices or other data processing devices.

Further, the display devices $1002_1$, $1002_2$, ... $1002_N$, 1008, 1010 can be provided access to and/or receive application software executed and/or stored on any of the other remote server 1012. The remote server 1012 can represent various forms of servers including, but not limited to a web server, an application server, a proxy server, a communication channel server, or a server farm.

In some examples, display devices $1002_1$, $1002_2$, ... $1002_N$, 1008, 1010 and 1010 performs functions of a social communication channel 1014 server 1012. In some implementations, the display devices $1002_1$, $1002_2$, ... $1002_N$, 1008, 1010 can communicate wirelessly through a communication interface (not shown), which may include digital signal processing circuitry where necessary. The communication interface can provide for advertisement information based on a user location of under various modes or protocols, AM signal, an FM signal, a phase modulated signal, CDMA, TDMA, spread spectrum, the Internet, a WiFi connection, a Bluetooth connection, a Zigbee connection, a communication channel 1014, a wireless communication channel, a 3G communication channel, a 4G communication channel, a USB connection, or any combination thereof.

In another embodiment the communication interface can provide for advertisement information based on the user location of under various modes or protocols for the ticket and/or authorization is purchased and provided using the wireless device via the Internet, a WiFi connection, a communication channel, a wireless communication channel, a USB connection, or any combination thereof by triangulation, by a local positioning (LPS) device, by a global positioning system (GPS), or by any combination thereof.

In yet another embodiment the communication interface can provide for advertisement information based on a user location of under various modes or protocols based on FM signal, a phase modulated signal, CDMA, TDMA, spread spectrum, the Internet, a WiFi connection, a Bluetooth connection, a Zigbee connection, a communication channel, a wireless communication channel, a 3G communication channel, a 4G communication channel, a USB connection, or any combination thereof.

For example, the communication channel 1014 can also provide for advertisement information based on a user location may occur through a radio-frequency transceiver (not shown). In addition, short-range communication may occur, such as using a Bluetooth, WiFi, or other such transceiver.

In some implementations, the system 1000 can be a distributed client/server 1012 system that spans one or more communication channel 1014. The communication channel 1014 can be a large computer communication channel 1014, such as a local area communication channel 1014 (LAN), wide area communication channel 1014 (WAN), the Internet, a cellular communication channel 1014, or a combination thereof connecting any number of mobile clients, fixed clients, and servers 1012.

FIG. 1C depicts an example environment 1100 for advertisement cross-referencing based on displaying at least one advertisement by the remote server 1012 and display unit system 1102. The display unit system 1102 can be implemented, for example, using one or more display devices ($1002_1$, $1002_2$, ... $1002_N$, 1008 and 1010 of FIG. 1B). By way of a non-limiting example, one or more advertisement content 1112 is displayed on an application launch icon in a launch area of a display of the mobile computing device $1106_{1-N}$. However, the display devices $1002_1$, $1002_2$, ... $1002_N$, 1008 and 1010 and display devices $1106_{1-N}$ numbering are used interchangeably for convenience.

The example environment 1100 includes the system which includes the display unit 1102, with the display region variation determining unit 1110, the preloading controller 1104, and the preloading performing unit 1108 and displaying is performed by the display unit 1102 with the preloading an application in the memory 1030 of the mobile computing device $1106_{1-N}$ based on data stored in the remote server 1012 and displays the advertisement content 1112 on the display device $1106_{1-N}$. The modules are performed by the preloading controller 1104 and downloading is performed by the preloading performing unit 1108 by receiving input from the remote server 1012. The remote server 1012 provides the input from the user regarding application launch.

FIG. 2A is a pictorial snapshot of the dashboard having multiple data fields to generate one or more user profiles for providing one or more suitable career option in accordance with one or more embodiments of present generation.

Particularly, the data fields on the dashboard include multiple program parameters. Moreover, the program parameters is anyone of name, birthdates, education, gender, email, phone number, street address, posts, photos, videos associated with one or more users $1020_1$, $1020_2$, ... $1020_N$ and the like. The user data is not limiting to the above mentioned parameters it can also include other parameters. Once all the data fields are provided the user agrees to share the above data with the associates.

Figure 2B:
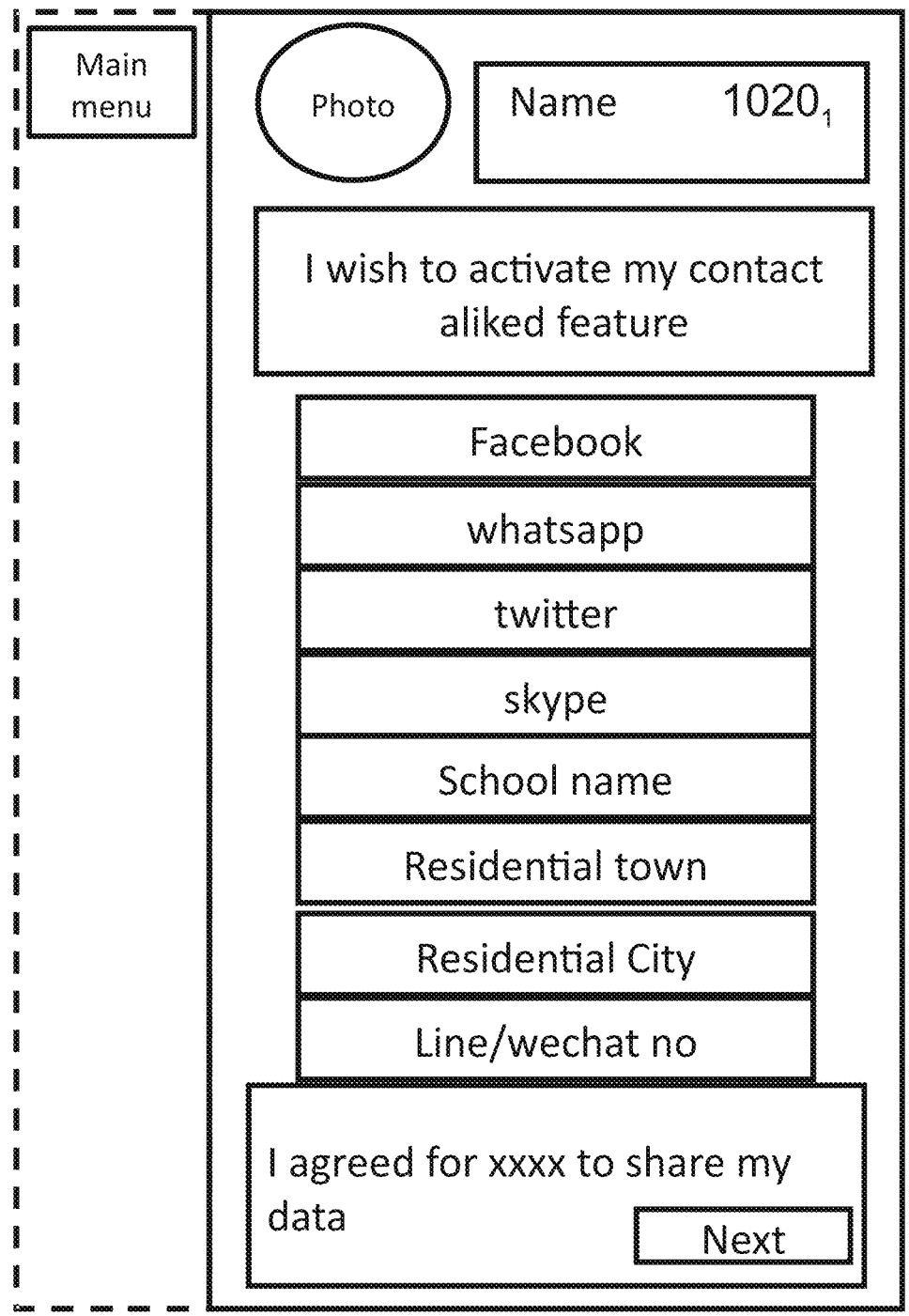
FIG. 2B is a pictorial snapshot of a dashboard illustrating activation of one or more alike contact to generate one or more user profiles for providing personalised career counselling in accordance with one or more embodiments of present invention.

FIG. 2B is a pictorial snapshot of a dashboard illustrating activation of one or more user profiles for allowing sharing of user data for the purpose of finding alike users $1020_1$, $1020_2$, ... $1020_N$ in accordance with another embodiment of present invention. Particularly, the one or more users $1020_1$, $1020_2$, ... $1020_N$ provide consent to share one or more user information. Moreover, when the one or more users $1020_1$, $1020_2$, ... $1020_N$ search for alike, the other users $1020_1$, $1020_2$, ... $1020_N$ can also search the users $1020_1$, $1020_2$, ... $1020_N$.

Subsequently, the one or more user profiles is generated by automatic filling of multiple data field and displayed on the one or more display devices. Moreover, the user $1020_1$, $1020_2$, ... $1020_N$ provides multiple parameters. Furthermore, multiple parameters is anyone of name, Facebook, Whatsapp, Twitter, Skype, School name, residential Town, residential City, Line or Wechat number, birthdates, education, gender, email, phone number, street address, posts, photos, videos associated with one or more users $1020_1$, $1020_2$, ... $1020_N$ and the like. The user data is not limiting to the above mentioned parameters it can also include other parameters. Moreover, the system 1000 displays name of one or more users $1020_1$, $1020_2$, ... $1020_N$ for initiating communication. Furthermore the system 1000 allows one or more users $1020_1$, $1020_2$, ... $1020_N$ to know each other data once one or more users agree to share information.

Furthermore, for one or more users $1020_1$, $1020_2$, ... $1020_N$ to find alike users one or more users $1020_1$, $1020_2$, ... $1020_N$ input further information and agree to share the information as per personal data protection act requirement in another screen.

FIG. 3 is a pictorial snapshot of a dashboard displaying multiple questions to determine and assess one or more abilities of the multiple users $1020_1$, $1020_2$, ... $1020_N$ based on one or more user categories for providing personalised career counselling in accordance with one embodiment of present invention Particularly, multiple user categories are selected from anyone of realistic category, investigative category, social category, artistic category, enterprise category, convectional category and the like. Furthermore, multiple questions are provided to one or more of users $1020_1$, $1020_2$, ... $1020_N$ in a survey form for providing personalized career counselling.

In operation as illustrated in FIG. 3 the dashboard is operably configured to provide one or more users $1020_1$, $1020_2$, ... $1020_N$ with a list of multiple questions. Subsequently, the user is requested to answer multiple questions with either of the options "Like" and "Dislike" based on self interest.

In one embodiment, the user selects and clicks on the option of "like" based on user's viewpoint of liking a particular question displayed from the list of multiple questions generated.

In another embodiment, the user selects and clicks on the option of "dislike" based on user's viewpoint of disliking the particular question displayed from the list of multiple questions generated.

In yet another embodiment, user leaves the particular question blank and moves to the next question displayed on the dashboard if in user's viewpoint that particular question is not of user's interest.

Figure 4:
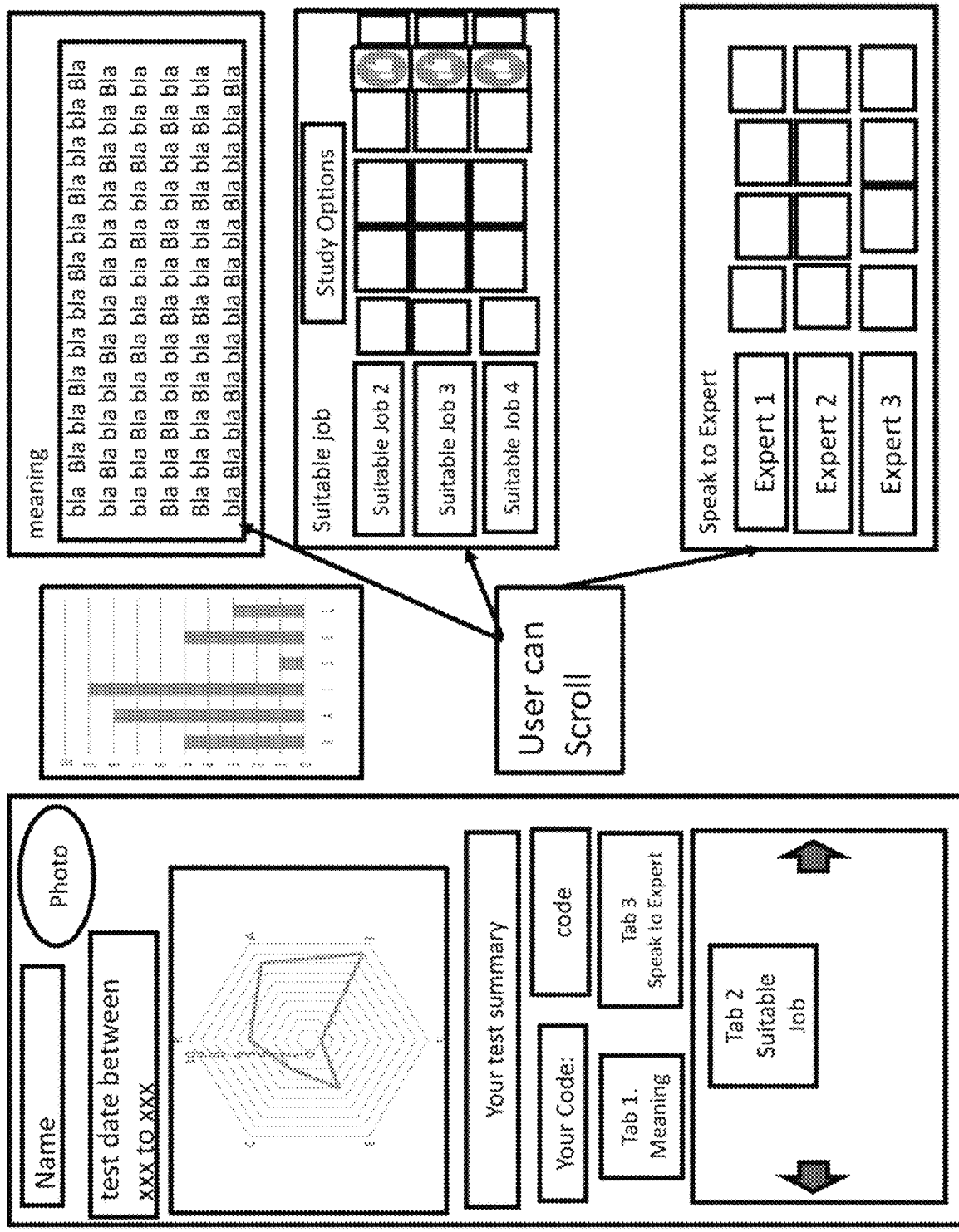
FIG. 4 is a pictorial screenshot of a display region variation determining unit interface displaying interface displaying personalized career information to one or more users on one or more display devices, in accordance with one or more embodiments of present invention.

FIG. 4 is a pictorial screenshot of a display region variation determining unit interface displaying interface displaying personalized career information to one or more users $1020_1$, $1020_2$, ... $1020_N$ on one or more display devices $1002_1$, $1002_2$, ... $1002_N$, 1008, 1010, in accordance with one or more embodiments of present invention The personalised career counselling interface is displayed on one or more display devices $1002_1$, $1002_2$, ... $1002_N$, 1008, 1010 summarizing the results and providing one or more suitable career options based on the analysis performed by the computing module.

Particularly, the display region variation determining unit interface summarizes the results based on multiple questions and user category as discussed in FIG. 3. Moreover, the display region variation determining unit interface also displays the analysis of answers received from the multiple of users $1020_1$, $1020_2$, ... $1020_N$ based on the computation of multiple questions and user category. Furthermore, it also displays a list of experts to select one or more expert for facilitating communication between one or more users $1020_1$, $1020_2$, ... $1020_N$ with the selected expert in a virtual chat room. Particularly, the chat room is operably configured to provide the multiple users $1020_1$, $1020_2$, ... $1020_N$ to communicate with the other users $1020_1$, $1020_2$, ... $1020_N$ without revealing personal information facilitating secure communication. Furthermore, the chat room also has a feature to reveal the personal information when they are comfortable is something new. Subsequently, the display region variation determining unit interface also multiple sponsors based on one or more strategic marketing campaigns.

Figure 5:
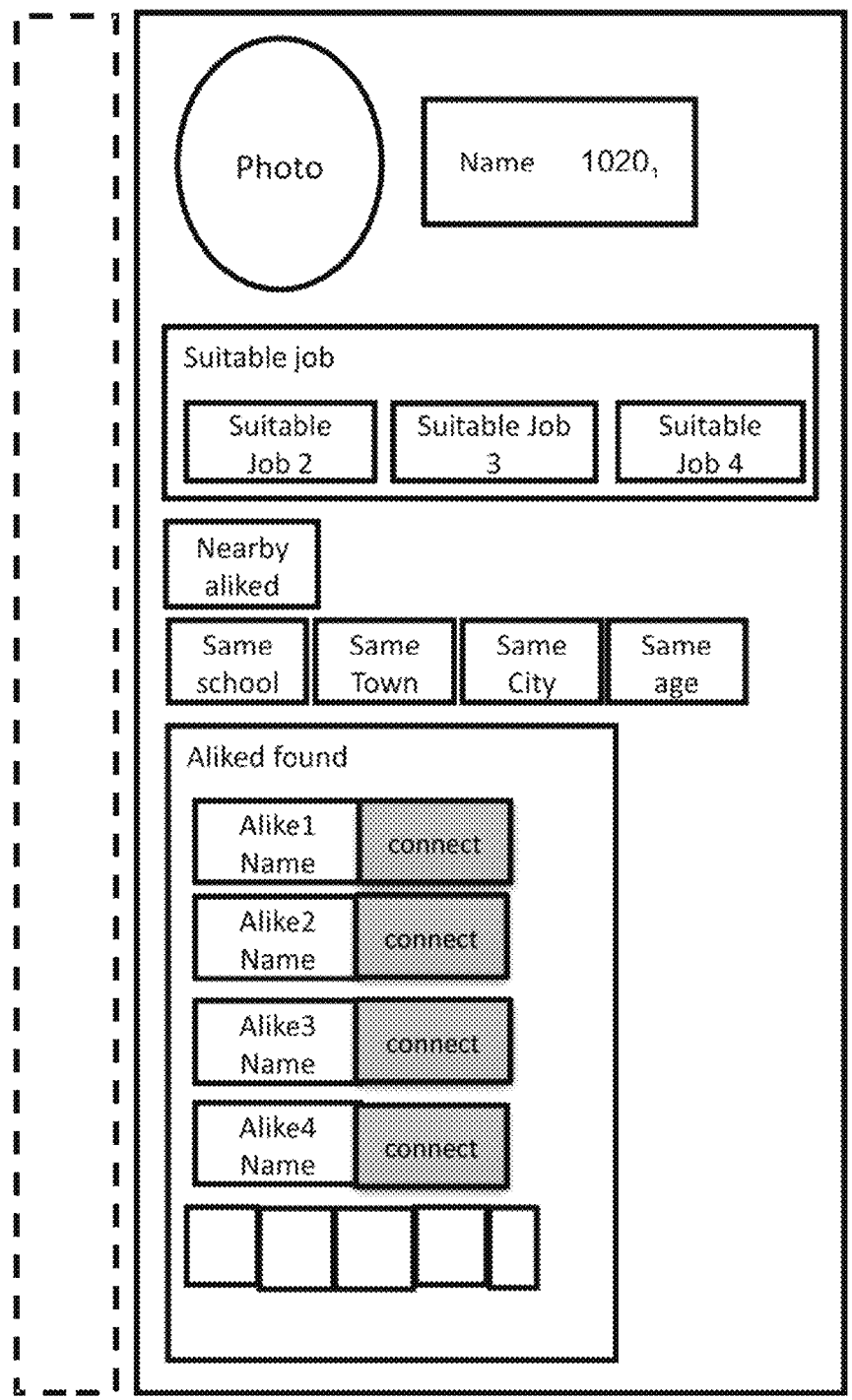
FIG. 5 is a pictorial representation of display region variation determining unit interface illustrating an user interface that provides users ability to set multiple searching parameters to find one or more alike users in accordance to one or more embodiments of present invention.

In another embodiment, one or more users $1020_1$, $1020_2$, ... $1020_N$ find one or more experts to facilitate communication for personalized survey submission. In particular the activation code is a code given to one or more users $1020_1$, $1020_2$, ... $1020_N$ by one or more expert. Moreover, the system 1000 also uses the code to link one or more users $1020_1$, $1020_2$, ... $1020_N$ to by one or more expert. Subsequently, system 1000 displays the expert with same activation code as first preference for consultation when one or more users $1020_1$, $1020_2$, ... $1020_N$ searches among one or more experts. Henceforth, one or more users $1020_1$, $1020_2$, ... $1020_N$ are able to be in-touch with the same expert who introduced one or more users $1020_1$, $1020_2$, ... $1020_N$ to the system 1000. However, the system 1000 does not restrict one or more users $1020_1$, $1020_2$, ... $1020_N$ from contacting other experts from list of expert. Particularly, the system 1000 displays other experts from list of experts option no two onwards after option one FIG. 5 is a pictorial representation of display region variation determining unit interface illustrating an user interface that provides users $1020_1$, $1020_2$, ... $1020_N$ ability to set multiple searching parameters to find one or more alike users $1020_1$, $1020_2$, ... $1020_N$ in accordance to one or more embodiments of present invention. Particularly, one or more users $1020_1$, $1020_2$, ... $1020_N$ set multiple parameters, enabling the system 1000 to search and display list of alike users $1020_1$, $1020_2$, ... $1020_N$ based on the given parameters. Moreover, one or more users $1020_1$, $1020_2$, ... $1020_N$ click connect button to initiate communication with other users $1020_1$, $1020_2$, ... $1020_N$. In particular the activation code is a code given to one or more users $1020_1$, $1020_2$, ... $1020_N$ by one or more expert. Subsequently, the display region variation determining unit interface also displays one or more boxes depicting one or more advertisements on one or more display devices $1002_1$, $1002_2$, ... $1002_N$, 1008, 1010.

Particularly, one or more users $1020_1$, $1020_2$, ... $1020_N$ are able to find one or more user who have activated the find-alike feature. The one or more modules of the present system is able to generate similar profile based on the algorithm of the present invention. Subsequently, one or more user $1020_1$, $1020_2$, ... $1020_N$ is provided with the option to make friends with similar profiles. Moreover, one or more users $1020_1$, $1020_2$, ... $1020_N$ initiate communication without data sharing via chat room with other users $1020_1$, $1020_2$, ... $1020_N$. Particularly, the chat room is operably configured to provide the multiple users $1020_1$, $1020_2$, ... $1020_N$ to communicate with the other users $1020_1$, $1020_2$, ... $1020_N$ without revealing personal information facilitating secure communication. Furthermore, the chat room also has a feature to reveal the personal information when they are comfortable is something new. Moreover, after communicating one or more users $1020_1$, $1020_2$, ... $1020_N$ share their informationlike contact details, sms number, whatsapp number and the like. Subsequently, one or more users $1020_1$, $1020_2$, ... $1020_N$ contact other users $1020_1$, $1020_2$, ... $1020_N$ with similar profiles identified by the present method via social media platforms like facebook, whatsapp, or via Short Message Service (SMS) with their consent.

In another embodiment of the present invention, the stand alone messages are stored in the admin database which is retrieved by one or more users $1020_1$, $1020_2$, ... $1020_N$. Particularly, one or more user $1020_1$, $1020_2$, ... $1020_N$ selects one or more messages and the message is communicated via the communication channel to the other users with similar profile.

In yet another embodiment, the system 1000 facilitates network building by providing special chat room to ensure secure chatting environment. Particularly, the one or more users $1020_1$, $1020_2$, ... $1020_N$ share information. Moreover, one or more users $1020_1$, $1020_2$, ... $1020_N$ expend to communicate via face-to-face meeting, going for events or programme together or whatsapp and the like.

In yet another embodiment of the present invention, the present system is able to retrieve all the contacts from user's email account. Particularly, one or more user selects one or more messages and the message is communicated via the communication channel to the other users $1020_1$, $1020_2$, ... $1020_N$ with similar profile.

Figure 6:
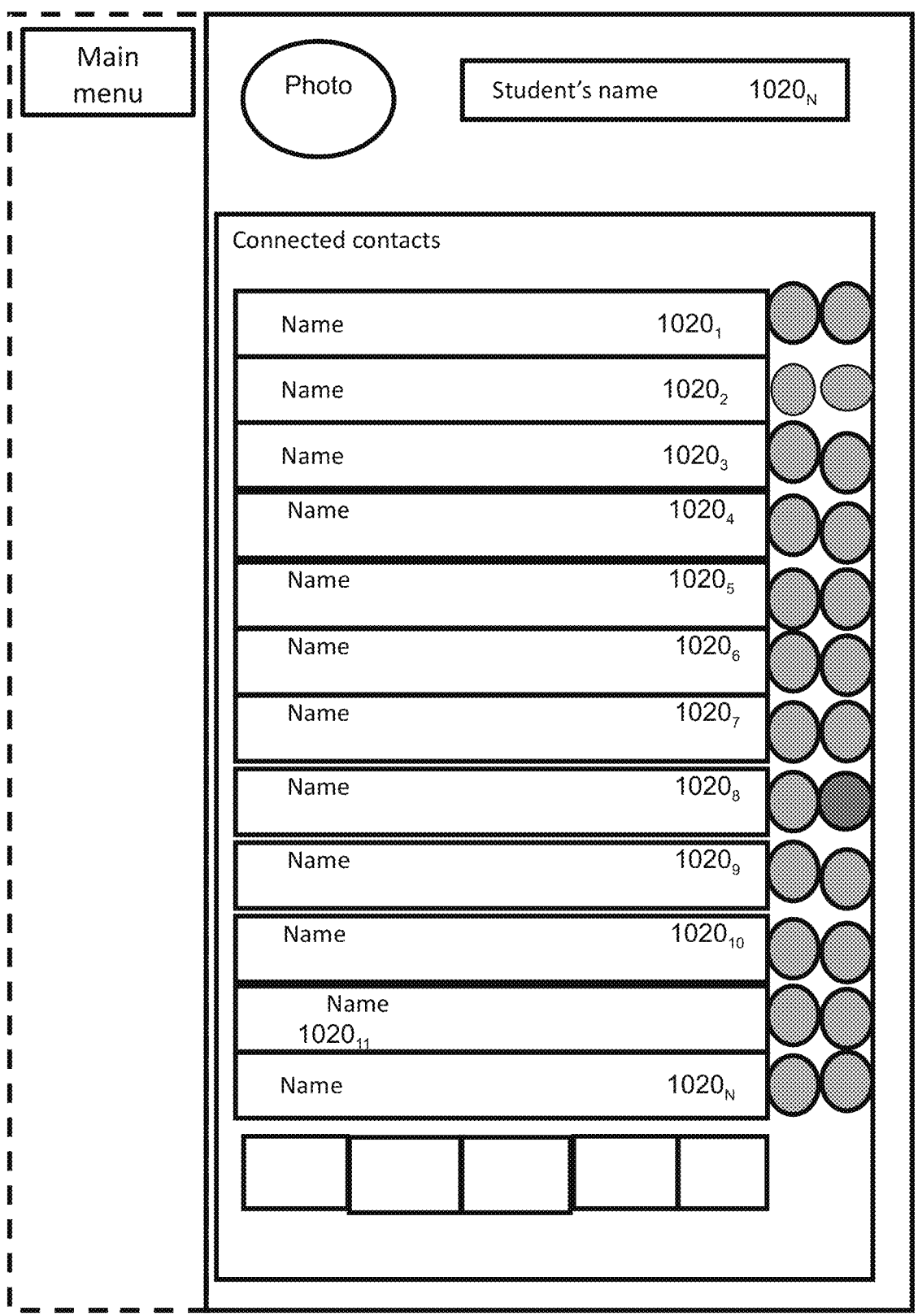
FIG. 6 is a pictorial representation of display region variation determining unit interface illustrating an chat room facilitating communication between the multiple users in one or more display devices, in accordance to another embodiment of present invention.

FIG. 6 is a pictorial representation of display region variation determining unit interface illustrating an chat room facilitating communication between the multiple users $1020_1$, $1020_2$, ... $1020_N$ in one or more display devices $1002_1$, $1002_2$, ... $1002_N$, 1008, 1010, in accordance to another embodiment of present invention. In particular the system 1000 illustrates first page of the chat room whereby the system 1000 list all contacts made by one or more users $1020_1$, $1020_2$, ... $1020_N$ on the right side of each contact. Moreover, the system 1000 has an indicator of unread messages and a button to share information. Furthermore, the interface also displays one or more boxes depicting one or more advertisements on one or more display devices $1002_1$, $1002_2$, ... $1002_N$, 1008, 1010.

In another embodiment of the present invention, one or more users $1020_1$, $1020_2$, ... $1020_N$ also select a contact and communicate via message in the form of a text or a picture via the communication network to one or more users $1020_1$, $1020_2$, ... $1020_N$ with a similar profile. In the present invention, all the chat between the alike contacts is stored in the chat database.

FIG. 7 is pictorial illustration of a sponsor dashboard setup with multiple sponsor fields to be viewed on one or more display device $1002_1$, $1002_2$, ... $1002_N$, 1008, 1010, in accordance to one or more embodiments of present invention. Particularly, the sponsor is a university, a college and similar educational institutions in one embodiment of the present invention. Moreover, sponsor dashboard with one or more sponsor dashboard items to display multiple sponsor logo to enable one or more users $1020_1$, $1020_2$, ... $1020_N$ to visit one or more sponsor website on one or more display device $1002_1$, $1002_2$, ... $1002_N$, 1008, 1010 by clicking on the sponsor logo. Furthermore, the sponsor provides data related to multiple parameters. The multiple parameters are any one of Institutional Name, Logo, Main URL, Email, Contact person, Contact Email and Contact telephone number. The sponsor data is not limiting to the above mentioned parameters it can also include one or more parameters.

Figure 8:
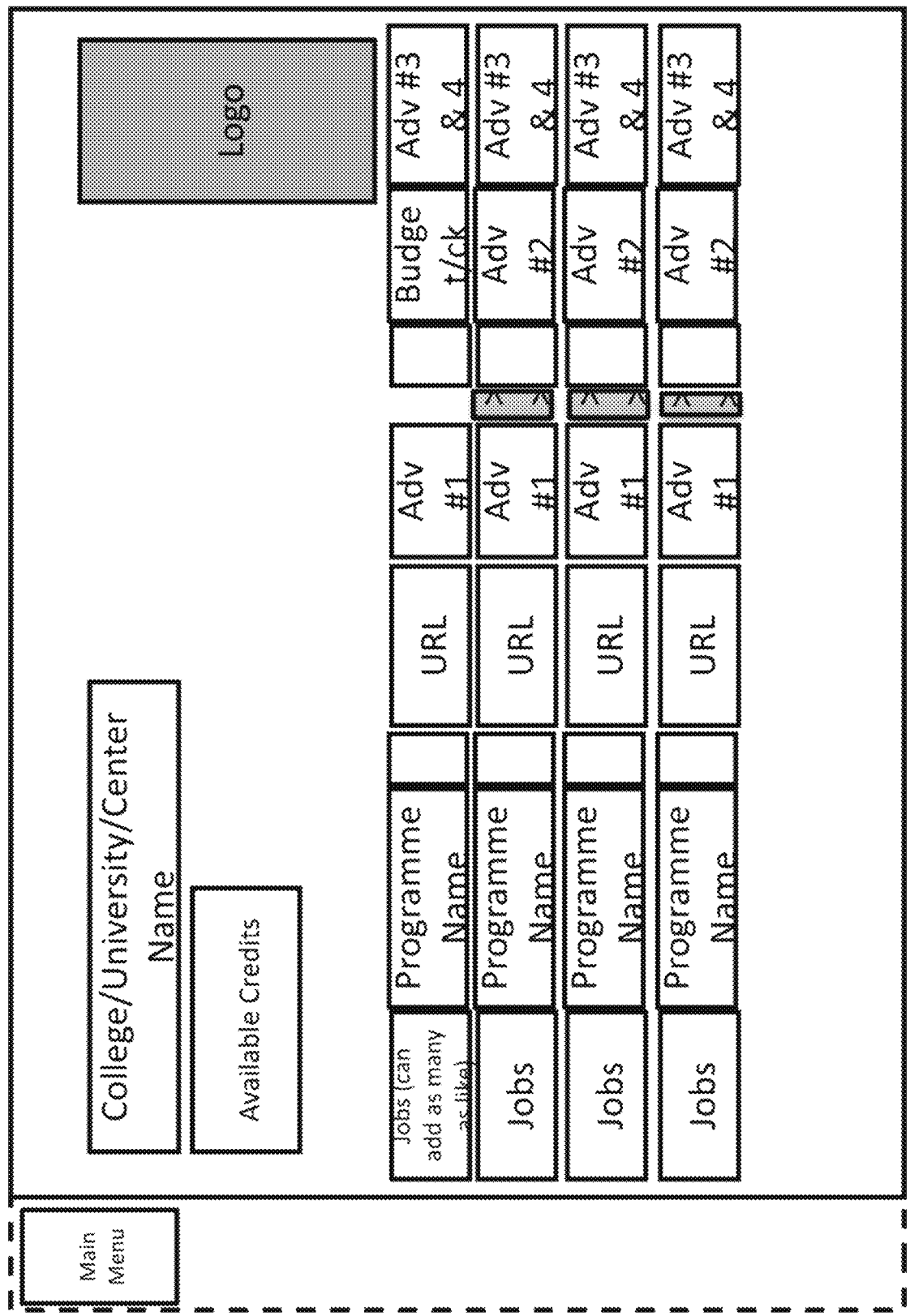
FIG. 8 is pictorial illustration of the advertisement setup of the sponsor dashboard to be viewed one or more display devices, in accordance to another embodiment of present invention.

FIG. 8 is pictorial illustration of the advertisement setup of the sponsor interface to be viewed one or more display devices $1002_1$, $1002_2$, ... $1002_N$, 1008, 1010, in accordance to another embodiment of present invention. Particularly, the sponsor is a university, a college and similar educational institutions in one embodiment of the present invention. Moreover, the system 1000 enables one or more sponsors to feed information in multiple data fields. Furthermore, the system 1000 displays one or more sponsor logo whenever appropriate. Henceforth, the system 1000 also allows sponsors to determine their advertisement strategy using the credits purchased by one or more sponsors.

In one embodiment, the sponsor uses first strategy for allocating credits to the sponsor strategic marketing campaign. Particularly, by selecting said one or more sponsors based on highest bid amount. Moreover, the sponsor is provided with the bidding options and the sponsor selects the highest bid. The highest bid is shown and remains for a week as long as there is no highest bidder.

In another embodiment, the sponsor uses second strategy for allocating credits to the sponsor strategic marketing campaign. Particularly, by selecting said one or more sponsors based on sponsor purchase credits. Moreover, a budget is utilized on per click.

In yet another embodiment, the sponsor uses third strategy for allocating credits to the sponsor strategic marketing campaign. Particularly, the sponsor purchase credits and place a budget for impression advertisement.

In further another embodiment of the present invention, the system will rotate impression advertisements with priority set according to the budget.

Figure 9:
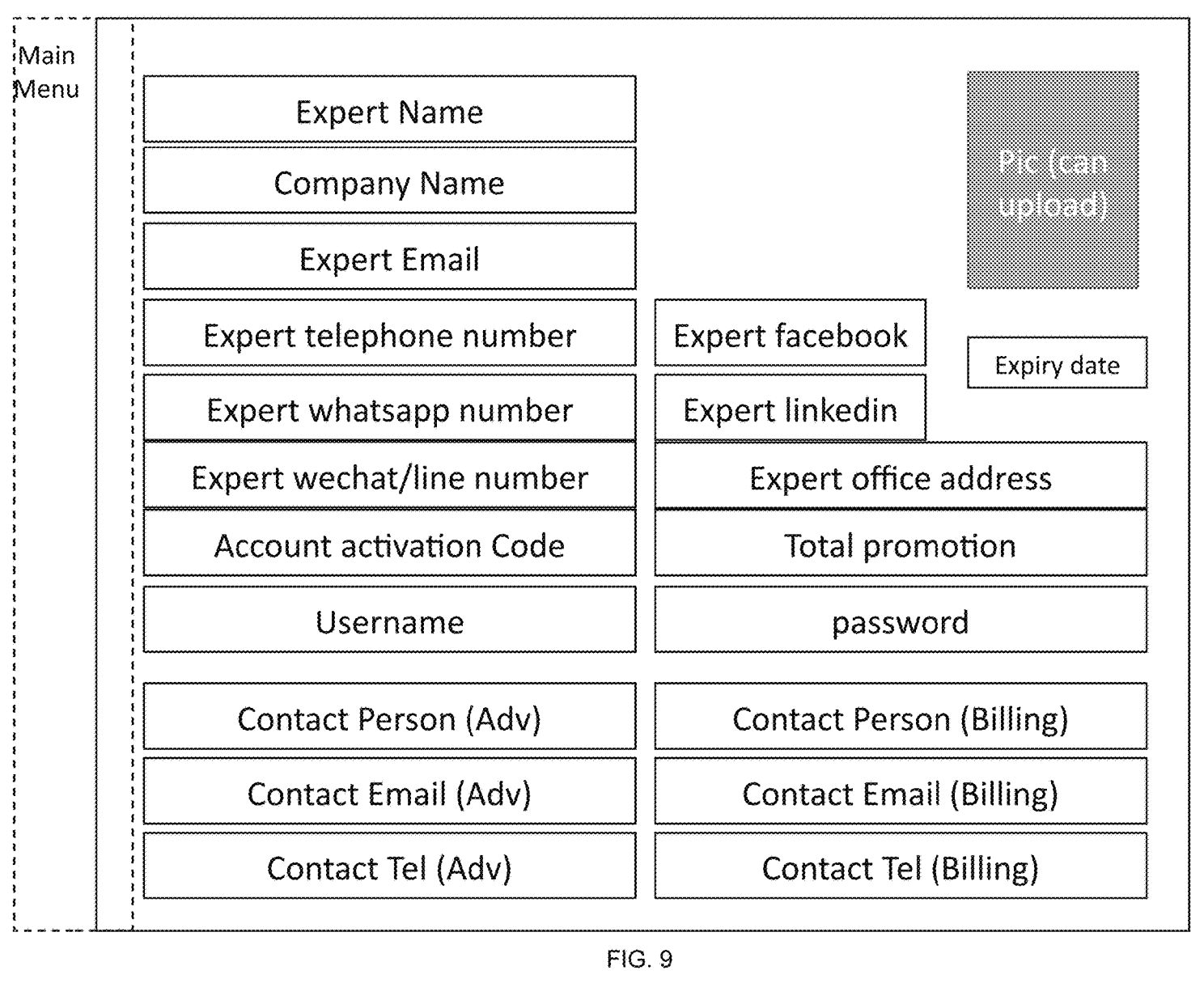

FIG. 9 is pictorial illustration of an expert dashboard setup with multiple expert fields to be viewed on one or more display device $1002_1$, $1002_2$, ... $1002_N$, 1008, 1010, in accordance to yet another embodiment of present invention. Particularly, an expert is selected from anyone of university agents, career counselors, school counselors and the like. Moreover, expert dashboard provides one or more expert profile to be viewed by one or more users $1020_1$, $1020_2$, ... $1020_N$. Furthermore, for completing of expert profile, one or more experts provide multiple data related to multiple expert parameters.

Particularly, multiple expert parameter is any one of Expert Name, Profile Picture, Company name, Expert Email, Expert Telephone number, Expert Whatsapp number, Expert facebook, Expert LinkedIn, Expert Office Address, Account activation code, Account Expiry date, Username, Password, Contact Person, Contact Email and Contact Telephone number. The expert data is not limiting to the above mentioned parameters it can also include one or more parameters.

Figure 10:
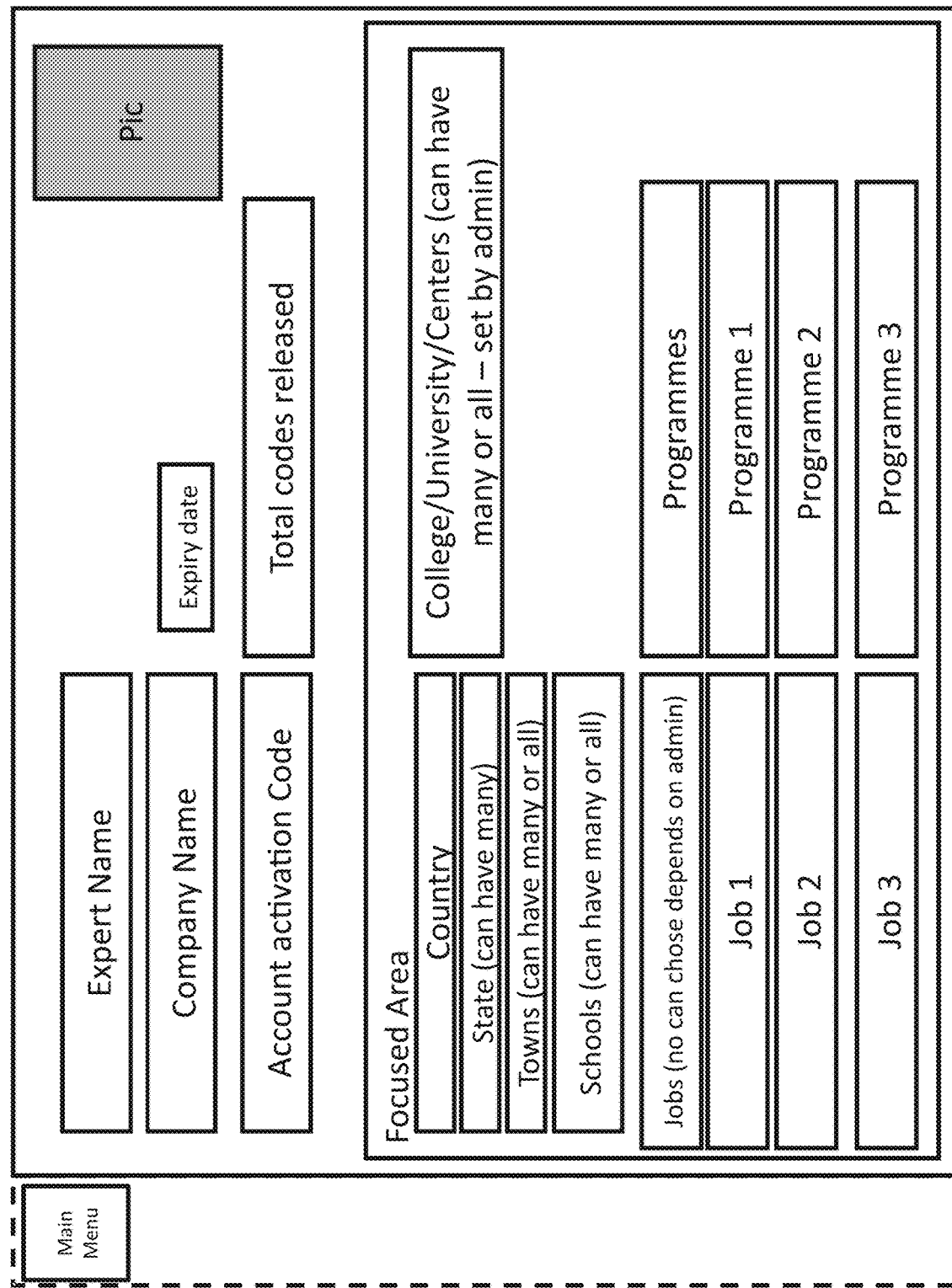
FIG. 10 is a pictorial illustration of display region variation determining unit interface displaying an expert dashboard webpage for personalized career counselling in accordance to one or more embodiments of present invention.

FIG. 10 is a pictorial illustration of display region variation determining unit interface displaying an expert dashboard webpage for personalized career counselling in accordance to yet another embodiment of present invention. Particularly, one or more user clicks on one or more experts selected from a list of expert. Moreover, a unique activation code is generated to every registered expert and one or more experts are selected from anyone of university agents, career counselors, school counselors and the like.

Furthermore, recommendation module executes a set of instructions to recommend one or more experts after retrieving from the database to one or more users $1020_1$, $1020_2$, ... $1020_N$. Subsequently, one or more $1020_1$, $1020_2$, ... $1020_N$ provide the unique activation code being listed first in the system. Also, unique activation code is based on at least one expert parameter selected from.

In yet another embodiment of present invention, one or more user provides any one or more of following details but not limiting to the Expert Name, Company Name, Account Activation Code, Profile Picture, Total codes released, Country, States, Towns, Schools, Institution Names, Jobs, and Programmes.

In further another embodiment of the present invention, the expert gives activation code to one or more users $1020_1$, $1020_2$, ... $1020_N$. And one or more users $1020_1$, $1020_2$, ... $1020_N$ activate the system linking one or more users $1020_1$, $1020_2$, ... $1020_N$ to one or more expert.

Figure 11:
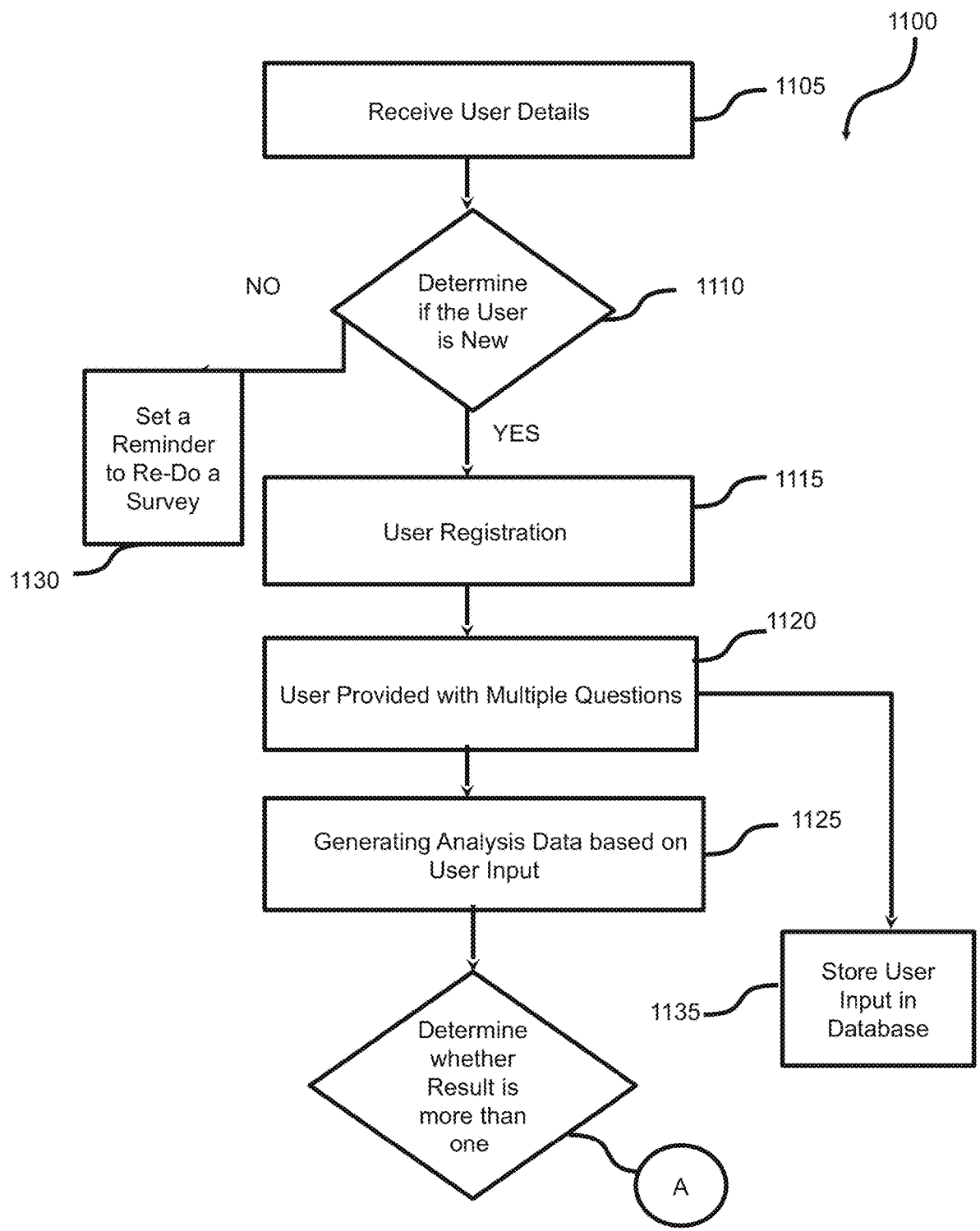
FIG. 11 is a flow diagram illustrating a method for a personalised career counselling provided to one or more users based on survey submission, in accordance with one or more embodiments of present invention.

FIG. 11 is a flow diagram illustrating a method for a personalised career counselling provided to one or more users $1020_1$, $1020_2$, ... $1020_N$ based on survey submission, in accordance with one or more embodiments of present invention. The method 1100 for providing personalised career counselling starts at step 1105 and proceeds to step 1110.

At step 1105, multiple user details are filled in multiple data fields provided by the one or more users $1020_1$, $1020_2$, ... $1020_N$. Particularly, the user details are received for carrying out personalised career counseling.

The step 1105 of method 1100 proceeds to step 1110. At step 1110, the method 1100 determines whether user is new or not.

In one embodiment if the determination is "NO" and the user is not new then the step 1110 method 1100 proceed to step 1130. At step 1130, a reminder is set to re-do the survey for to determine one or more suitable career options particularly, when one or more users $1020_1$, $1020_2$, ... $1020_N$ are already registered, and are not new to the system 1000. Moreover, the system 1000 determines whether period of last test date has exceeded six months. Furthermore, if the test date has exceeded six months the system 1000 reminds the user to do a new test. The system 1000 also displays one or more users $1020_1$, $1020_2$, ... $1020_N$ last test results. However, all user old records are also downloaded again into one or more display devices $1002_1$, $1002_2$, ... $1002_N$, 1008, 1010 by one or more user to retrieve the old test result. Subsequently, review one or more codes to continue to use the system 1000. In another embodiment if the determination is "YES" and the user is new then it proceeds to step 1115. At step 1115, one or more users $1020_1$, $1020_2$, ... $1020_N$ are registered. The step 1115 proceeds to step 1120. At step 1120, one or more users $1020_1$, $1020_2$, ... $1020_N$ are provided with multiple questions to determine and assess one or more abilities of multiple users $1020_1$, $1020_2$, ... $1020_N$ based on one or more user category. Particularly, results are assessed for providing personalised career counseling. Moreover, user inputs are stored in the database on the server.

The step 1120 proceeds to step 1125. At step 1125, analysis of data is done based on user input. Particularly, user profile of one or more user is generated based on multiple data fields and multiple questions retrieved from a server. Moreover, generation of the user profile is done to determine one or more suitable career options. Furthermore, one or more suitable career options for one or more users $1020_1$, $1020_2$, ... $1020_N$ are generated based on a computation performed by the computing module of the server.

In accordance to another embodiment of present invention, the method includes steps of providing anyone option of like or dislike to the multiple users $1020_1$, $1020_2$, ... $1020_N$ to answer the multiple questions and automatically generating one or more experts based on one or more expert parameters. Particularly, initiating and facilitating communication between the one or more experts selected from the available experts and the one or more users $1020_1$, $1020_2$, ... $1020_N$ in a virtual chat room via the communication channel. In operation, providing anyone option of like or dislike to the multiple users $1020_1$, $1020_2$, ... $1020_N$ to answer the multiple questions. Furthermore, if the one or more users $1020_1$, $1020_2$, ... $1020_N$ do not select an answer to a question from the multiple questions the computing module of the server automatically select the option of dislike and computation is based on analyzing the answers by a trend formula by dividing the answer to the multiple of questions the into two parts and calculating the average change percentage in part one of the trend formula based on a multiple of answers from start of the test to latest test result. Particularly, calculating the average change percentage over last three test in part two of the trend formula to determine trend change by comparing the average change percentage of the part one and the part two. Moreover, the trend percentage change in is result of one or more results based on the calculation of the part one and the part two.

In one embodiment, the trend change utilizes the part one trend percentage results when the part one and the part two results are growing percentage trends and when the part two growing percentage is lesser than the part one percentage. In another embodiment, the trend change utilizes the part two trend percentage results when the part one and the part two are growing percentage and when the part two growing percentage is greater than the part one percentage by more than twenty percentage.

In yet another embodiment, the trend change utilizes the part two trend percentage results when the part one and the part two has different growing trend and when part two growing percentage is greater than the part one percentage by more than twenty five percentage.

In yet another embodiment, the trend change utilizes the part one trend percentage results when the part one and the part two has different growing trend and part two growing percentage is lesser than the part one percentage by more than twenty five percentage.

Figure 12:
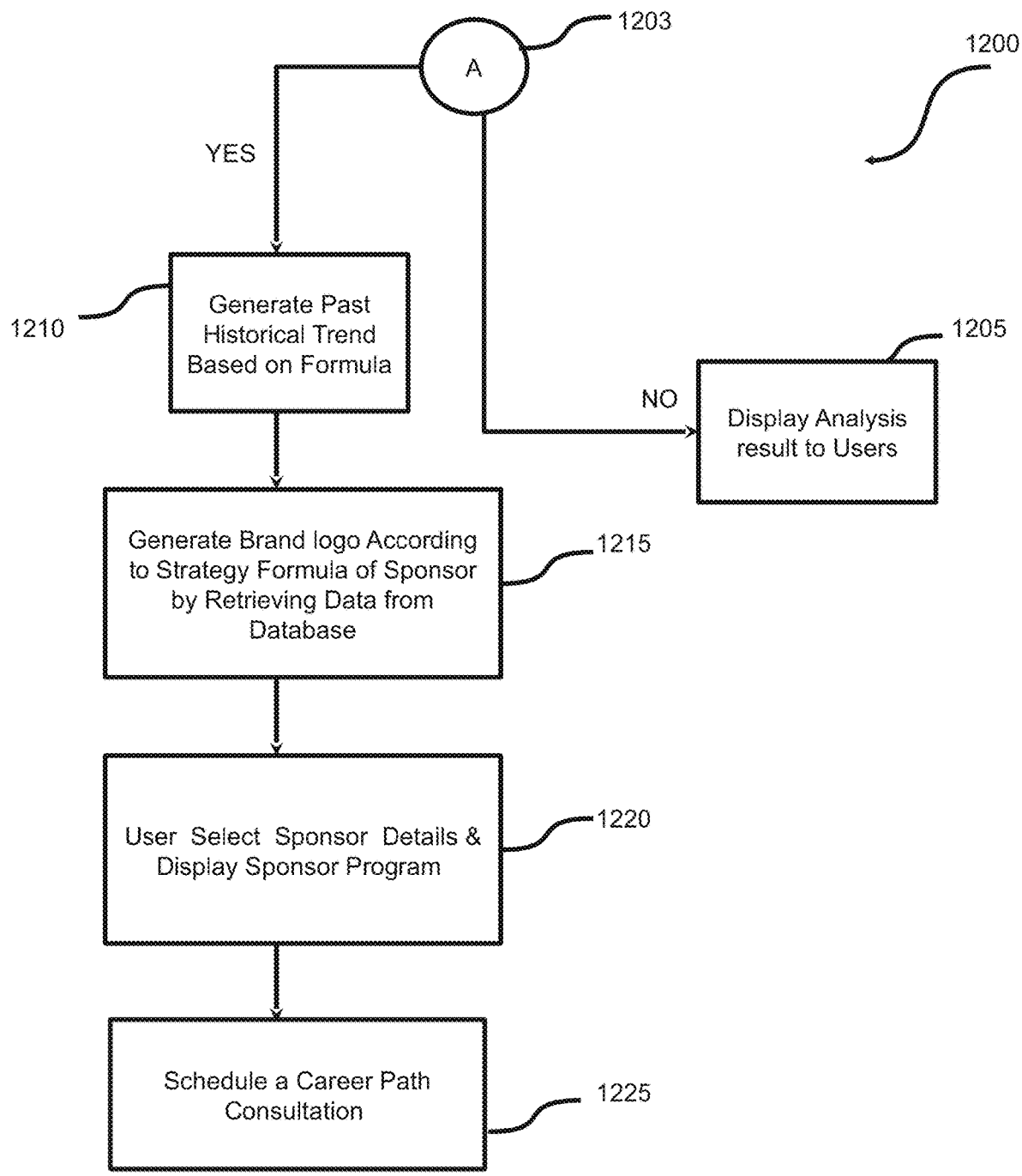
FIG. 12 is a flow diagram illustrating a method for a personalised career counselling provided to one or more users based on survey submission, in accordance with one or more embodiments of present invention.

The step 1125 proceeds to step A as illustrated in FIG. 11 and step A and subsequent steps are described in detail in FIG. 12.

FIG. 12 is a flow diagram illustrating a method for a personalised career counselling provided to one or more users $1020_1$, $1020_2$, ... $1020_N$ based on survey submission to generate a report, in accordance with one or more embodiments of present invention. The method 1200 is continuation of method 1100. The method 1200 starts at step 1203 and proceeds to 1205. At step 1203, the method 1200 determines whether results are more than 1.

In one embodiment, when the determination is "NO" and the result is not more than 1. The step 1203 proceeds to step 1205. At step 1205, the results of the personalized career counselling are displayed to one or more users $1020_1$, $1020_2$, ... $1020_N$ on one or more display device $1002_1$, $1002_2$, ... $1002_N$, 1008, 1010.

In another embodiment when the determination is "YES" and the result is more than 1. The step 1203 proceeds to step 1210. At step 1210, past historical trends are generated based on the analysis of answers received from the multiple of users $1020_1$, $1020_2$, ... $1020_N$.

If the determination is "YES" the user $1020_1$, $1020_2$, ... $1020_N$ view both latest test report as well as a trend analysis based report.

In yet another embodiment when the determination is regardless of "NO" or "YES". Particularly, in this case both the results provide one or more users with one or more sponsor logos. Moreover, one or more users $1020_1$, $1020_2$, ... $1020_N$ also contact one or more sponsors from the list of sponsor.

The step 1210 of method 1200 proceeds to step 1215. At step 1215, a brand logo is generated according to strategy formula of sponsor by retrieving data from database.

The step 1215 of method 1200 proceeds to step 1220. At step 1220, one or more user $1020_1$, $1020_2$, ... $1020_N$ selects one or more sponsor data. Subsequently, multiple sponsor data is received by multiple sponsors to be viewed by multiple users.

The step 1220 of method 1200 proceeds to step 1225. At step 1225, a personalised career counselling is initiated between multiple users $1020_1$, $1020_2$, ... $1020_N$ and one or more expert.

Figure 13A:
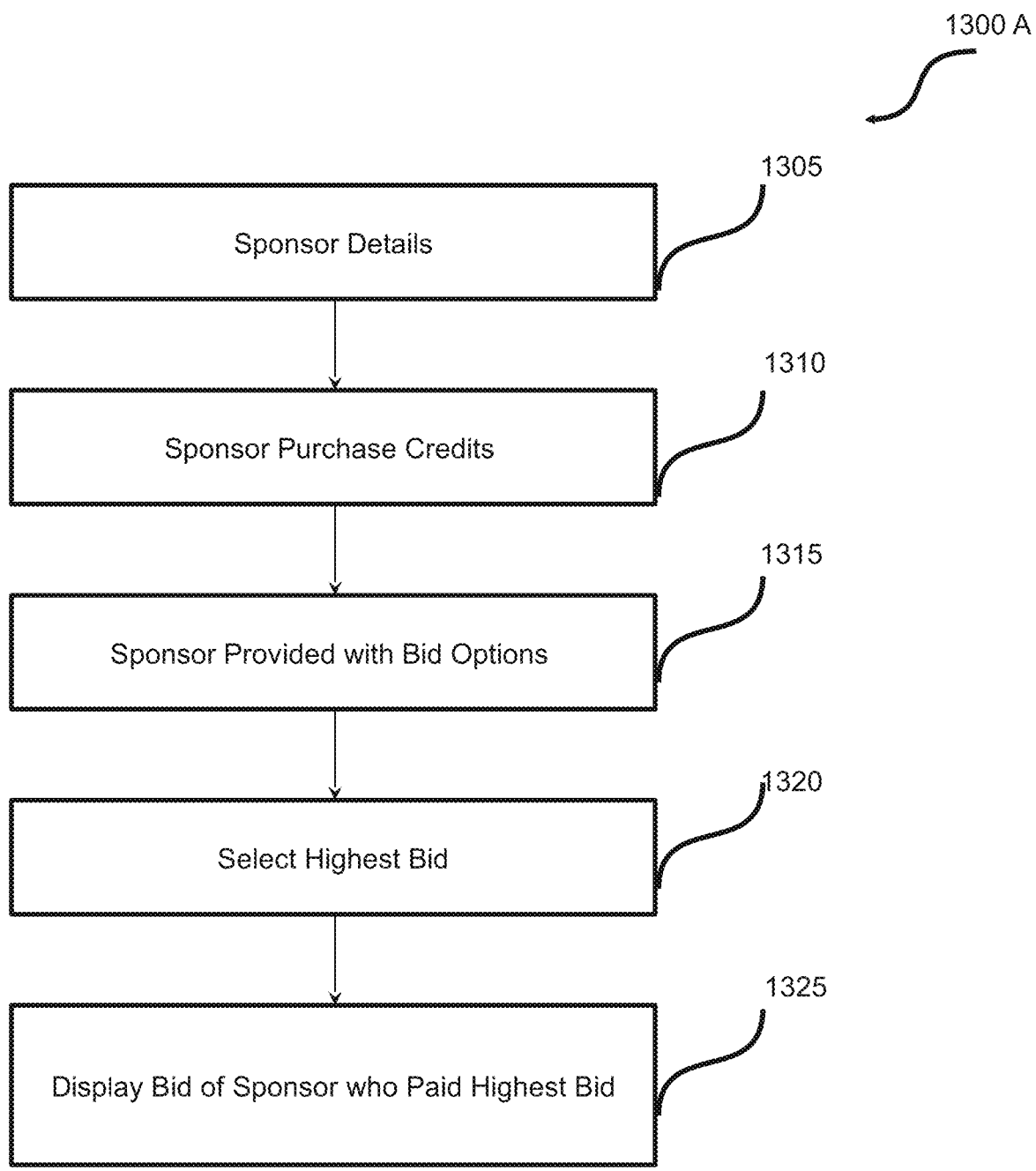
FIG. 13A is a flow diagram illustrating first strategy method of allocating credits in a sponsor interface module in accordance with one embodiment of present invention.

FIG. 13A is a flow diagram illustrating first strategy method of allocating credits in a sponsor interface module in accordance with one embodiment of present invention. Particularly, the method 1300A executes the first strategy for allocating credits to the sponsors. The credits are allocated for advertising, in accordance to one embodiment of the present invention. Moreover, the sponsor is a university, a college and similar educational institutions in one embodiment of the present invention.

The method 1300A starts at step 1305 proceeds to step 1310. At step 1305, the sponsor dashboard displays multiple sponsor details. Particularly, the dashboard includes one or more sponsor dashboard items displaying multiple sponsor logo. Moreover, the sponsor logo profiles are used by the system Al to relate to one or more occupational parameter.

The step 1305 of method 1300A proceeds to step 1310. At step 1310, one or more sponsor purchase credits are purchased by one or more sponsors. Particularly, allocating and purchasing one or more sponsor purchase credits to one or more sponsors based on one or more strategic marketing campaigns.

The step 1310 of method 1300A proceeds to step 1315. At step 1315, multiple sponsors are provided with multiple bidding options. Particularly, receiving bid amount for strategic marketing campaign by said plurality of sponsors. Moreover, one or more bidding options are selected based on one or more sponsor purchase credits.

The step 1315 of method 1300A proceeds to step 1320. At step 1320, the sponsor selects the highest bid for advertising. Particularly, strategic marketing campaign is selected of said one or more sponsors based on highest bid amount. Moreover, the bid amount is received by the campaign module. The bid with maximum purchase credit is selected.

The step 1320 of method 1300A proceeds to step 1325. At step 1325, selected strategic marketing campaign of one or more sponsor is displayed. Particularly, the brand logo of one or more sponsor is also displayed to multiple users $1020_1$, $1020_2$, ... $1020_N$ for a defined time-period. Preferably, the defined time-period depends on number of sponsors, bid placed, purchase credits and similar factors. Therefore, the present method 1300 A provides a strategy, which is able to compete without any boundaries.

Figure 13B:
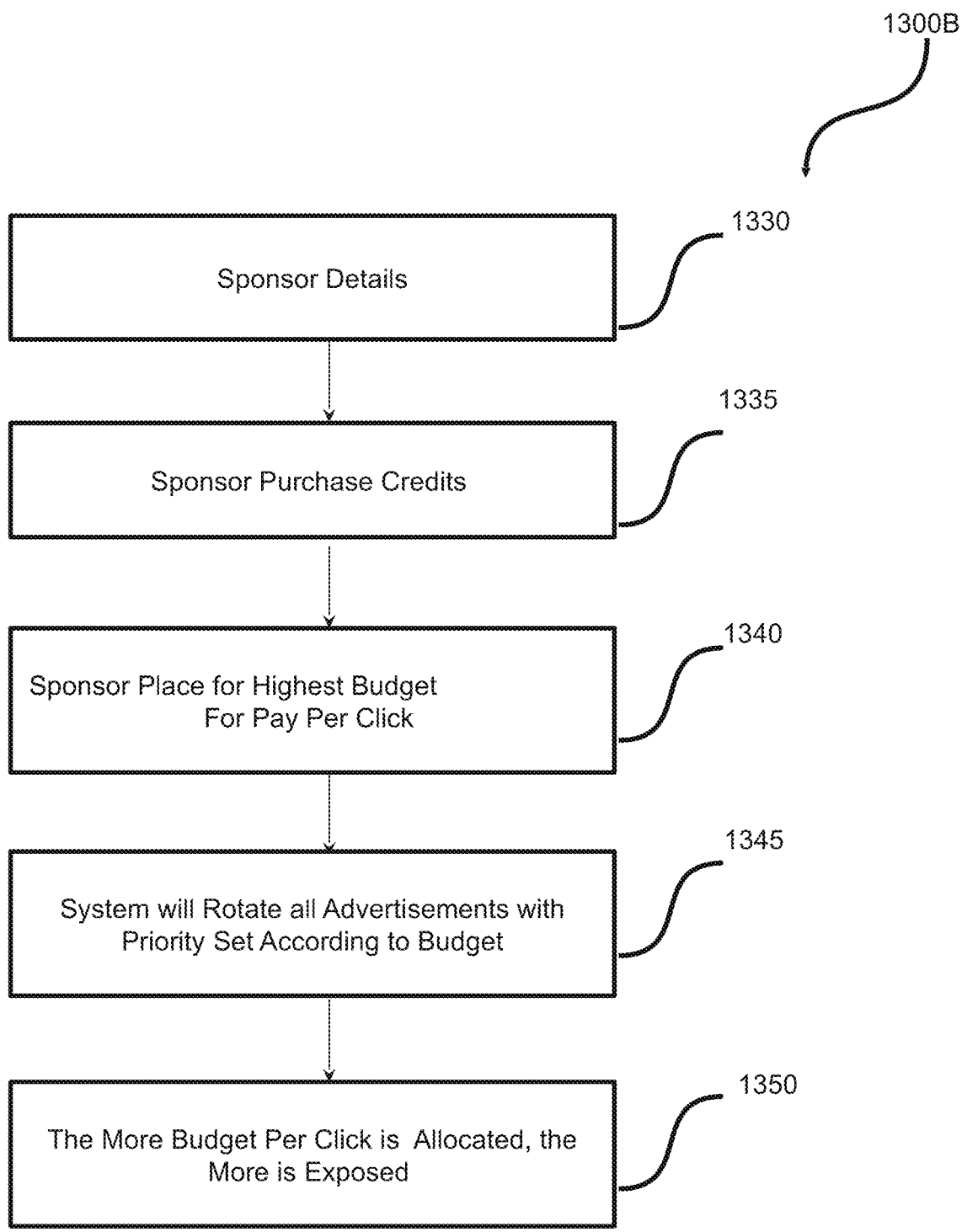
FIG. 13B is a flow diagram illustrating first strategy method of allocating credits in a sponsor interface module in accordance with another embodiment of present invention.

FIG. 13B is a flow diagram illustrating first strategy method of allocating credits in a sponsor interface module in accordance with another embodiment of present invention. Particularly, the method 1300B executes second strategy for allocating credits to the sponsors. The credits are allocated for advertising, in accordance to one embodiment of the present invention. Moreover, the sponsor is a university, a college and similar educational institutions in one embodiment of the present invention.

The method 1300B starts at step 1330 proceeds to step 1335. At step 1330, the sponsor dashboard displays multiple sponsor details. Particularly, the dashboard displays multiple sponsor logo to enable multiple users to visit one or more sponsor website on one or more display device by clicking on the sponsor logo. Moreover, the sponsor logo is viewed by multiple users $1020_1$, $1020_2$, ... $1020_N$ by receiving the sponsor data on one or more display devices $1002_1$, $1002_2$, ... $1002_N$, 1008, 1010.

The step 1330 of method 1300B proceeds to step 1335. At step 1335, one or more sponsor purchase credits are purchased by one or more sponsors. Particularly, allocating and purchasing one or more sponsor purchase credits to one or more sponsors based on one or more strategic marketing campaigns.

The step 1335 of method 1300B proceeds to 1340. At step 1340, sponsor places for highest budget for pay per click. Particularly, bid amount for strategic marketing campaign is received by one or more sponsors to position for highest budget for pay per click by one or more users $1020_1$, $1020_2$, ... $1020_N$. The step 1340 proceeds to step 1345.

At step 1345, the system rotates multiple advertisements. Particularly, the rotation of advertisement is set based on the priority. Moreover, a priority is set according to the received bid amount and allocating at least one strategic marketing campaign based on more budgets per click.

The step 1345 of method 1300B proceeds to step 1350. At step 1350, more budget per click is allocated by the sponsor for advertisement. Moreover, budget is directly proportional advertisement exposed. More budget per click is allocated more advertisements are exposed.

Particularly, the method 1300B executes second strategy for allocating credits to the sponsors. The credits are allocated for advertising, in accordance to one embodiment of the present invention. Moreover, the sponsor is a university, a college and similar educational institutions in one embodiment of the present invention.

Figure 13C:
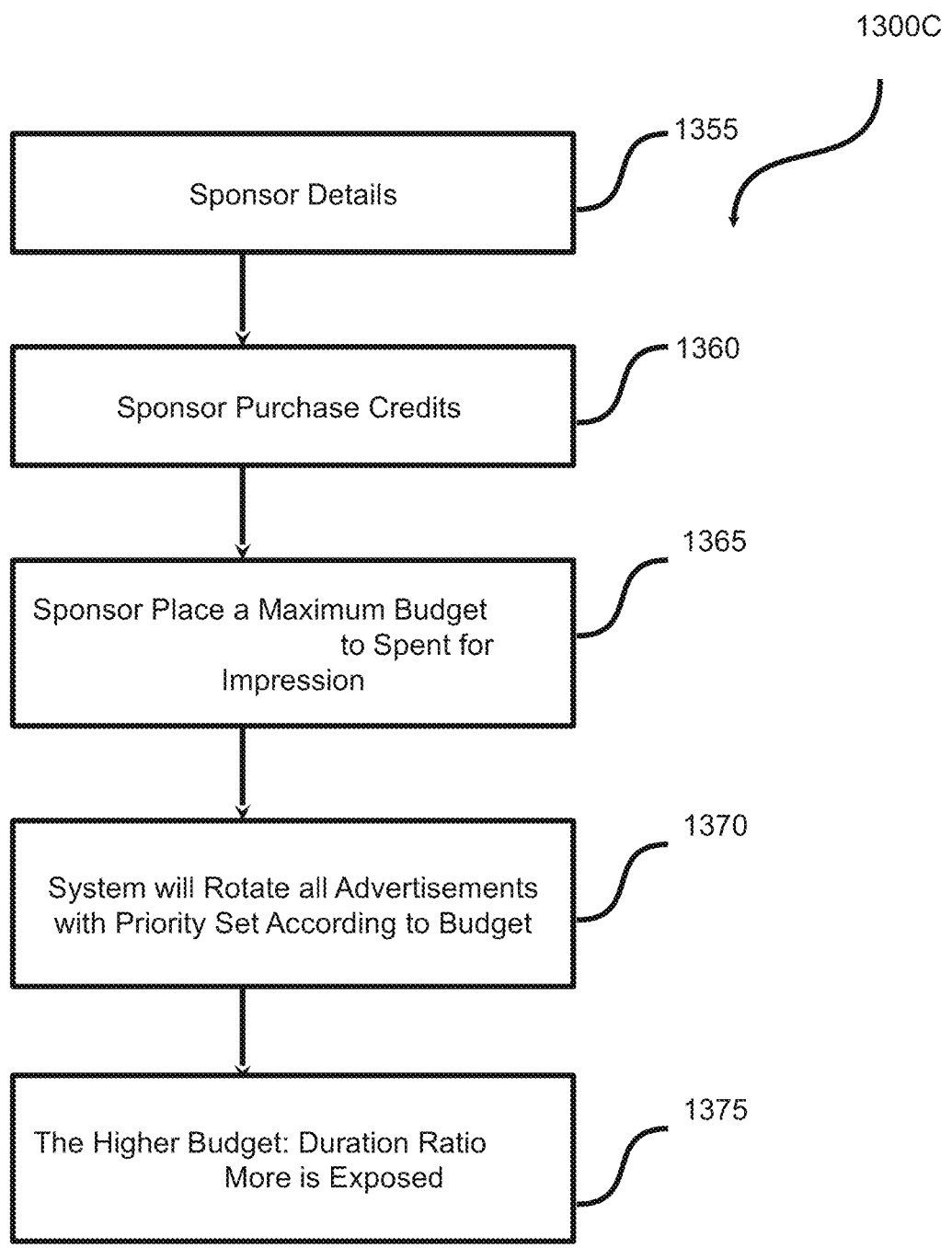
FIG. 13C is a flow diagram illustrating first strategy method of allocating credits in a sponsor interface module in accordance with yet another embodiment of present invention.

FIG. 13C is a flow diagram illustrating the third strategy for allocating credits to the sponsors for advertising, according to one embodiment of the present invention. Particularly, the method 1300C executes third strategy for allocating credits to the sponsors. The credits are allocated for advertising, in accordance to one embodiment of the present invention. Moreover, the sponsor is a university, a college and similar educational institutions in one embodiment of the present invention.

The method 1300C starts at step 1355 proceeds to step 1360. At step 1355, the sponsor dashboard displays multiple sponsor details. Particularly, the dashboard includes one or more sponsor dashboard items displays multiple sponsor logo to enable multiple users to visit one or more sponsor website on one or more display device by clicking on the sponsor logo. Moreover, the sponsor logo is viewed by multiple users $1020_1$, $1020_2$, ... $1020_N$ by receiving the sponsor data on one or more display devices $1002_1$, $1002_2$, ... $1002_N$, 1008, 1010.

The step 1355 of method 1300C proceeds to step 1360. At step 1360, one or more sponsor purchase credits are purchased by one or more sponsors. Particularly, allocating and purchasing one or more sponsor purchase credits to one or more sponsors based on one or more strategic marketing campaigns.

The step 1360 of method 1300C proceeds 1365. At step 1365, one or more sponsors places a maximum budget. Particularly, the maximum bid amount for strategic marketing campaign by one or more sponsors is spent to create strategic marketing campaign impression.

The step 1365 proceeds to 1370. At step 1370, the system rotates multiple advertisements. Particularly, the rotation of advertisement is set based on the priority. Moreover, a priority is set according to the received bid amount and allocating at least one strategic marketing campaign based on more budget per click.

The step 1370 of method 1300C proceeds to 1375. At step 1375, a ratio is generated. Particularly, ratio is generated of higher budget to duration time of one or more strategic marketing campaign impression. Moreover, higher the budget more is the duration and exposure of strategic marketing campaign impression.

Particularly, one or more sponsors are selected based on one or more different criteria. Therefore, the present method 1300C provides third strategy leading to either internal advertisement column or local advertisement column.

Figure 14:
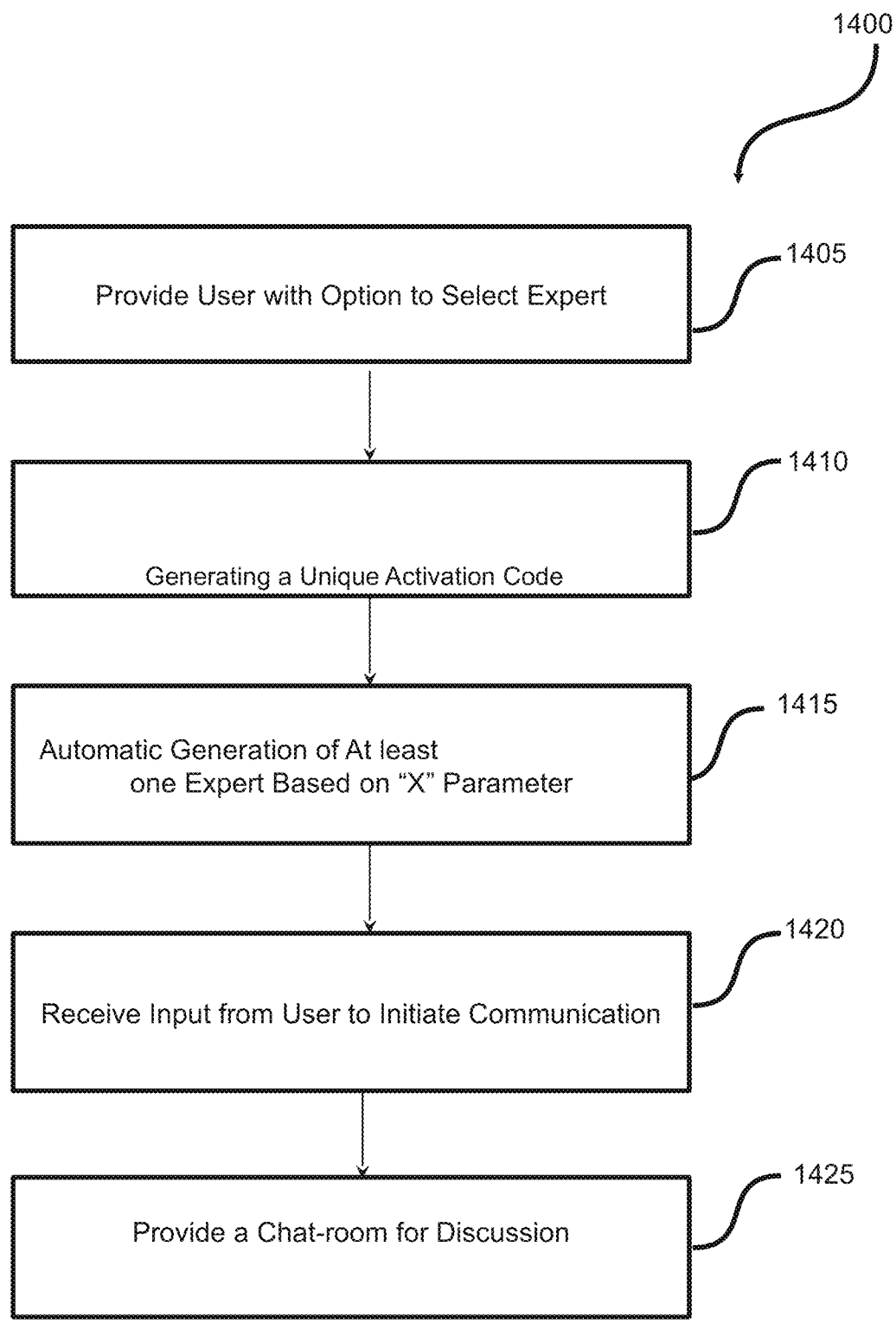
FIG. 14 is a flow diagram of a method initiating and facilitating communication between one or more users with one or more experts, in accordance to one embodiment of the present invention.

FIG. 14 is a flow diagram of a method initiating and facilitating communication between one or more users $1020_1$, $1020_2$, ... $1020_N$ with one or more experts, in accordance to one embodiment of the present invention.

The method 1400 starts at step 1405 and proceeds to step 1410. At step 1405, the method provides one or more users $1020_1$, $1020_2$, ... $1020_N$ with an option of selecting one or more experts. Particularly, one or more expert profile is selected by retrieving data from the expert database. Moreover, one or more users $1020_1$, $1020_2$, ... $1020_N$ are provided with an expert dashboard with one or more expert dashboard items. Furthermore, one or more users $1020_1$, $1020_2, \ldots 1020_N$ view expert profiles and selects one or more expert from list of multiple experts.

The step 1405 of method 1400 proceeds to step 1410. At step 1410, a unique activation code is generated and allocated to every registered expert. Particularly, one or more expert is selected from anyone of university agents, career counselors, school counselors and the like.

The step 1410 proceeds to step 1415. At step 1415, the system automatically generates one or more experts based on one or more expert parameters. Particularly, the expert parameter is selected from anyone of respond speed to user request in real time and a number of expert activations.

The step 1415 of method 1400 proceeds to step 1420. At step 1420, the system receives input from one or more uses initiating communication with one or more expert.

The step 1420 of method 1400 proceeds to step 1425. At step 1425, one or more users $1020_1, 1020_2, \ldots 1020_N$ are provided with a virtual chat room to communicate with the experts.

Particularly, communication between one or more expert selected from list of multiple experts and one or more users $1020_1, 1020_2, \ldots 1020_N$ in a virtual chat room is done via communication channel. Moreover, the chat between one or more users $1020_1, 1020_2, \ldots 1020_N$ and one or more expert is stored in the chat database.

Figure 15:
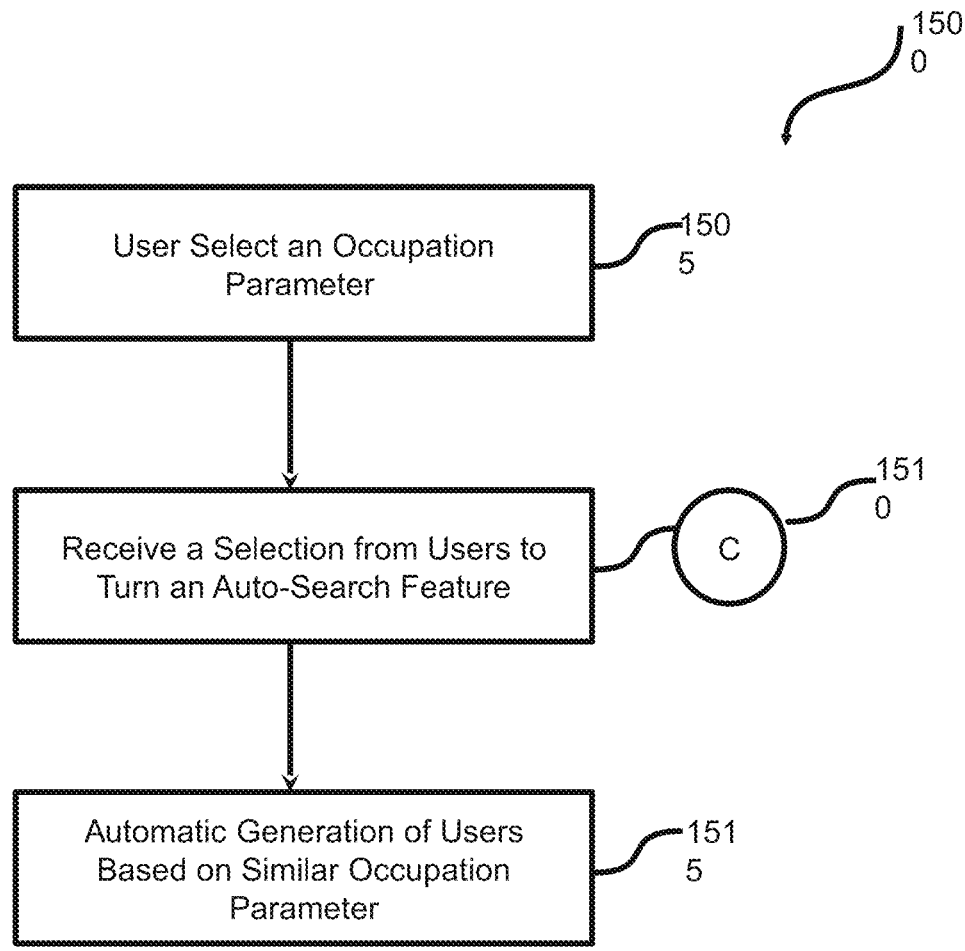
FIG. 15 is a flow diagram of a method initiating and facilitating communication between one or more users in accordance to another embodiment of the present invention.

FIG. 15 is a flow diagram of a method initiating and facilitating communication between one or more users $1020_1, 1020_2, \ldots 1020_N$ in accordance to another embodiment of the present invention. Particularly, one or more users $1020_1, 1020_2, \ldots 1020_N$ chooses occupation of interest. In one embodiment, the system 1000, initiates and facilitates communication of one or more users $1020_1, 1020_2, \ldots 1020_N$ with other users $1020_1, 1020_2, \ldots 1020_N$ using multiple parameters in a chat room.

In another embodiment, the system 1000 initiates and facilitates communication between one or more users $1020_1, 1020_2, \ldots 1020_N$ with one or more experts for consultation.

In yet another embodiment, the system 1000 initiates and facilitates communication between one or more users $1020_1, 1020_2, \ldots 1020_N$ to contact one or more sponsors offering educational pathway. Particularly, the system 1000 links one or more users $1020_1, 1020_2, \ldots 1020_N$ to the sponsor website setup by the sponsor on the sponsor dashboard.

In yet another embodiment, the system 1000 generate a list of alike users $1020_1, 1020_2, \ldots 1020_N$ with whom one or more users initiate communication using combination of the RAISEC code, occupation like, bio-data and the like.

Particularly, one or more users $1020_1, 1020_2, \ldots 1020_N$ initiate communication without data sharing via chat room with other users $1020_1, 1020_2, \ldots 1020_N$. Moreover, after communicating one or more users $1020_1, 1020_2, \ldots 1020_N$ share their informationlike contact details, sms number, whatsapp number and the like.

The method 1500 starts at step 1505 and proceeds to step 1510. At step 1505, one or more occupational parameter is selected by one or more users.

The step 1505 of method 1500 proceeds to step 1510. At step 1510, Auto-Search Feature is turned on after selecting one or more occupational parameter by one or more users $1020_1, 1020_2, \ldots 1020_N$.

Particularly, one or more users $1020_1, 1020_2, \ldots 1020_N$ with same occupational parameter are filtered out.

The step 1510 of method 1500 proceeds to step 1515. At step 1515, one or more users $1020_1, 1020_2, \ldots 1020_N$ with same occupational parameter are automatically generated.

Figure 16:
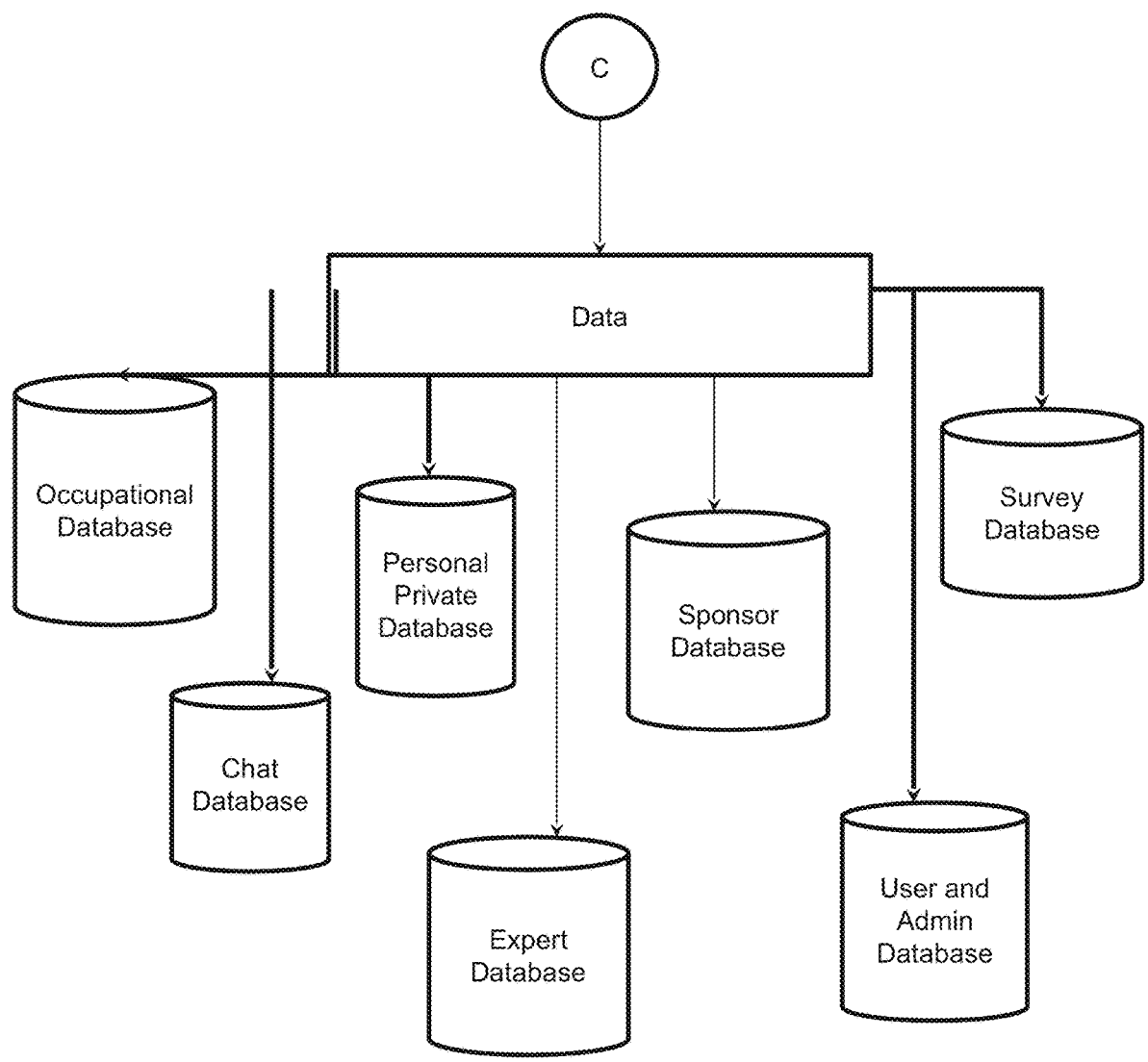
FIG. 16 is a pictorial representation of multiple databases for storing and generating data related to one or more program parameters in accordance with one or more embodiments of present invention.

FIG. 16 is a pictorial representation of a multiple databases for storing and generating data related to one or more program parameters in accordance with one or more embodiments of present invention. Particularly, the database is anyone of the occupational database, user database, survey database and the like. In particular, databases are used for storing multiple data related to program parameters.

Particularly, the user databases includes of user information, user profile, user history responses and alike. Moreover, the survey database has information corresponding to course and predicting potential category based on the computing module and information matching to survey response analysis. Furthermore, occupational database stores multiple lists of occupations.

Therefore, the present system and method provides the ease to the users to get the affirmation of the subject they should pursue as a career option in real time based on different identified categories of the individual.

What is claimed is:

1. A method for a personalised career counselling provided to a plurality of users comprises step of:

receiving and registering a plurality of data fields provided by said plurality of users;

generating a user profile of at least one user based on said plurality of data fields;

providing a plurality of questions retrieved from a server to determine at least one suitable career option generated for said at least one user based on a computation performed by a computing module of said server and analysis of answers received from said plurality of users;

matching analysis of answers received for said plurality of questions with data stored in an occupational database of said server;

monitoring usage of said system by said plurality of users and sending reminder to at least one user to answer said plurality of questions;

providing additional provision to said plurality of users to view analysis by retrieving past historical trend data comprised of a previous analysis of answers received from a previous plurality of users:

providing an expert dashboard with one or more expert dashboard items to a plurality of experts to prepare an expert profile to be matched based on a pluralit of user decision;

generating a unique activation code to every registered expert;

linking said unique activation code of said registered expert to said plurality of expert to display said registered expert as first choice among said plurality of expert;

wherein, said recommendation module executes a set of instructions to recommend at least one or more experts to said plurality of users who provide said unique activation code being listed first in said system and further based on at least one expert parameter;

facilitating communication between said one or more users with said plurality of experts in a virtual chat room in a computer communication channel via the Internet, wherein said plurality of experts is selected from one or more university agents, career counselors, and school counselors;

providing developmental support to said one or more users by said plurality of experts based on said plurality of data fields filled for said personalised career counselling, receiving a plurality of sponsor data by a plurality of sponsors to be viewed by said plurality of users, wherein said plurality of sponsors is one or more educational institutions;

and connecting said one or more users to said plurality of sponsors offering said occupational courses.

2. The method as claimed in claim 1 wherein said method further comprises steps of:
providing an option of like or dislike to said plurality of users to answer said plurality of questions;
automatically generating at least one expert based on at least one expert parameter;
initiating and facilitating communication between said at least one expert selected from said plurality of experts and said at least one user in a virtual chat room via said communication channel; and
providing an option of like or dislike to said plurality of users to answer said plurality of questions; and wherein, if said at least one user do not select an answer to a question from said plurality of questions said computing module automatically select said option of dislike;
analyzing said answers by a trend formula by dividing said answer to said plurality of questions said into two parts;
calculating an average change percentage in part one of said trend formula based on a plurality of answers from start of said test to latest test result;
calculating said average change percentage over last three test in part two of said trend formula;
determining trend percentage by comparing said average change percentage of said part one and said part two;
wherein said trend percentage results in one of different results based on said calculation of said part one and said part two.

3. The method as claimed in claim 2, further comprises steps of selecting one or more occupational parameters by said one or more users and automatically turning auto-search feature after selecting said one or more occupational parameters by said one or more users; filtering said one or more users with same occupation and automatically generating one or more users with said same occupational parameter.

4. The survey submission system as claimed in claim 2, wherein said trend change utilizes said part one trend percentage results when said part one and said part two results are growing percentage trends and when said part two growing percentage is lesser than said part one percentage.

5. The survey submission system as claimed in claim 2, wherein said trend change utilizes said part two trend percentage results when said part one and said part two are growing percentage and when said part two growing percentage is greater than said part one percentage by more than twenty percentage.

6. The survey submission system as claimed in claim 2, wherein said trend change utilizes said part two trend percentage results when said part one and said part two has different growing trend and when part two growing percentage is greater than said part one percentage by more than twenty five percentage.

7. The survey submission system as claimed in claim 2, wherein said trend change utilizes said part one trend percentage results when said part one and said part two has different growing trend and part two growing percentage is lesser than said part one percentage by more than twenty five percentage.

8. The method as claimed in claim 1, wherein said method fUrther comprises steps of:
providing a plurality of sponsor purchase credits are utilized by said plurality of sponsors by allocating one or more sponsor purchase credits on said one or more strategic marketing campaigns,
providing a sponsor dashboard with one or more sponsor dashboard items to a plurality of sponsors to display a plurality of sponsor logo to enable said plurality of users to visit at least one sponsor website on said at least one display device by clicking on said plurality of sponsor logo;
providing a plurality of sponsor purchase credits to be purchased by said plurality of sponsors via said credit module; and
allowing said plurality of sponsors to make one or more strategic marketing campaign decisions by allocating one or more sponsor purchase credits retrieving said one or more strategic marketing campaigns to execute a set of instructions to perform following steps:
receiving bid amount for strategic marketing campaign by said plurality of sponsors;
deciding highest bid for strategic marketing campaign based anyone of a plurality of occupation matches for a plurality of occupational courses and on a plurality of bids by plurality of competitors for said occupational course
displaying said selected strategic marketing campaign of said at least one sponsor for a defined time-period and tapping one or more advertisements of said at least one sponsor to view information of said selected strategic marketing campaign by said plurality of users
deducting sponsor purchase credit from said highest bid to display one or more subsequent highest bid.

9. The method as claimed in claim 8, wherein said campaign module is operably configured to execute a set of instructions to perform following steps:
receiving bid amount for strategic marketing campaign by said plurality of sponsors to position for highest budget for pay per click by said at least one user;
generating a ratio of higher budget to duration time of said strategic marketing campaign impression
rotating said plurality of strategic marketing campaign based on a ratio formula for said one or more advertisements determined by budget allocated for each tap on said one or more advertisements;
setting priority according to said received bid amount and allocating at least one strategic marketing campaign based on more budget per click
displaying said one or more advertisement for a time frame and deducting sponsor purchase credit;
wherein said rotation of one or more advertisement with higher frequency ratio is provided to said one or more sponsors allocated with higher budget for each pay per click.

10. The method as claimed in claim 1, wherein said plurality of questions is based on a plurality of category abilities and said plurality of category abilities is selected from anyone of a a plurality investigative category, a plurality social category, a plurality artistic category, a plurality enterprise category, and said plurality of questions are provided to said plurality of users in a survey form.

* * * * *